United States Patent

Kamabora et al.

Patent Number: 5,404,854
Date of Patent: Apr. 11, 1995

[54] KNOCK CONTROL SYSTEM FOR INTERNAL COMBUSTION ENGINE

[75] Inventors: Koichi Kamabora, Tokoname; Koji Sakakibara, Hekinan; Hiroshi Haraguchi, Kariya; Toshiharu Iwata, Nukata; Koichi Toyama, Kariya; Toshihito Nonaka, Obu, all of Japan

[73] Assignee: Nippondenso Co., Ltd., Kariya, Japan

[21] Appl. No.: 133,381

[22] Filed: Oct. 8, 1993

[30] Foreign Application Priority Data

Oct. 12, 1992 [JP] Japan .................. 4-272846

[51] Int. Cl.6 ............................................. F02P 5/14
[52] U.S. Cl. .................................................. 123/425
[58] Field of Search ............... 123/425, 421, 417, 435; 364/431.08; 73/35

[56] References Cited

U.S. PATENT DOCUMENTS

| | | | |
|---|---|---|---|
| 4,498,331 | 2/1985 | Nakamura et al. | 73/35 |
| 4,622,638 | 11/1986 | Anderson et al. | 364/431.08 |
| 4,993,387 | 2/1991 | Sakakibara et al. | 123/425 |
| 5,054,448 | 10/1991 | Matsuoka et al. | 123/425 |
| 5,060,615 | 10/1991 | Hashimoto et al. | 123/425 |
| 5,121,729 | 6/1992 | Hashimoto et al. | 123/425 |
| 5,134,980 | 8/1992 | Sakakibara et al. | 123/425 |
| 5,136,998 | 8/1992 | Deutsch | 123/421 |
| 5,186,145 | 2/1993 | Sakakibara | 123/425 |
| 5,205,258 | 4/1993 | Hashimoto et al. | 123/425 |
| 5,241,937 | 9/1993 | Kanehiro et al. | 123/425 |

FOREIGN PATENT DOCUMENTS

| | | | |
|---|---|---|---|
| 112508 | 7/1984 | European Pat. Off. | 123/425 |
| 346799 | 12/1989 | European Pat. Off. | 123/425 |
| 421952 | 4/1991 | European Pat. Off. | 123/425 |
| 492467 | 7/1992 | European Pat. Off. | 123/425 |
| 529786 | 3/1993 | European Pat. Off. | 123/425 |
| 539071 | 4/1993 | European Pat. Off. | 123/425 |
| 3345354 | 6/1985 | Germany | 123/425 |
| 56-12831 | 2/1981 | Japan | 123/425 |
| 56-12832 | 2/1981 | Japan | 123/425 |
| 57-99133 | 6/1982 | Japan | 123/425 |
| 59-46519 | 3/1984 | Japan | 123/425 |
| 63-42112 | 8/1988 | Japan | 123/425 |
| 4219465 | 2/1992 | Japan | 123/425 |

Primary Examiner—Raymond A. Nelli
Attorney, Agent, or Firm—Cushman, Darby & Cushman

[57] ABSTRACT

A knocking vibration detecting unit (1) and a knock deciding unit (c) are integrated, and the communications of a knock intensity between the knock deciding unit (c) and an engine controlling microcomputer (7) are carried out in combination of a change from the previous value of a signal line level. In the engine controlling microcomputer (7), the ignition timing is controlled by a predetermined retard angle in case of combination of no change of the present read signal line level from the previous signal line level.

Thus, an internal combustion engine is prevented from any damage by relieving a failure without fail when a signal line (10) is troubled, while minimizing the influences of noises and reducing the space and size of an ECU.

20 Claims, 18 Drawing Sheets

KNOCK CONTROL SYSTEM FOR INTERNAL COMBUSTION ENGINE

BACKGROUND OF THE INVENTION

The present invention relates to a knock control system for controlling ignition timing of an internal combustion engine in dependence upon occurrence of knock in the engine.

In the prior art, there is disclosed in Japanese Patent Laid-Open No. 46519/1984 or Japanese Patent Publication No. 42112/1988, for example, a system which is equipped with a microcomputer (as will be shortly referred to as "micom" for detecting the knocking accurately in addition to a microcomputer for controlling the same and which transmits the detected knock result from the knock detecting micom to the knock controlling micom.

In this prior art system, however, a knock sensor for detecting the knock to be encountered by an internal combustion engine is made separate from the knock detecting micom. As a result, the accurate knock detection may be impossible with the noise which may occur on the line connecting the knock sensor and the knock detecting micom. On the other hand, the knock detecting micom and the knock controlling micom are packaged in one engine control unit (as will be abbreviated into "ECU"), which may fail to have a sufficient space for packaging the micons.

In order to make the system entirely compact, on the other hand, it has been conceived to have the knock sensor packaged with a semiconductor circuit for detecting whether or not a knock is occurring (as is disclosed in Japanese Utility Model Registration Laid-Open No. 12831/1981, for example).

It is, therefore, conceivable to package the knock detecting micron integrally in the knock sensor.

In this system, however, the signal for transmitting the detected knock result from the knock detecting micom to the knock controlling micom is once outputted to the outside of the ECU so that the possibility of troubles will increase. In case the communicating signal lines are troubled, the knock controlling micom may decide that no knock has occurred, even if the knock detecting micom decides the occurrence of a knock.

The reason why this mistake happens will be described in the following. In case the detected knock result is expressed by the combination of the levels at ports $Q_2$ and $Q_3$ of the knock detecting sides of the communication signal lines between the knock detecting micom and the knock controlling micom, the result is enumerated in Table 1:

TABLE 1

| Detected Result | No | Low | Medium | High |
|---|---|---|---|---|
| Port $Q_2$ | 0 | 1 | 0 | 1 |
| Port $Q_3$ | 0 | 0 | 1 | 1 |

If either the ports $Q_2$ or $Q_3$ for outputting the detected knock result or the signal lines for the communication between the two micons are troubled to fix the ports $Q_2$ and $Q_3$ at 0, the knock controlling micom always decides that there is no knock. Then, there arises a problem that a retard control is not effected to damage the internal combustion engine even if a knock occurs.

In case, on the other hand, the knock sensor and the knock detecting micom are integrally packaged, the larger space for leading out the signal lines is required for the larger number of signal lines. Thus, there arises another problem that the space capacity is increased.

SUMMARY OF THE INVENTION

In view of the problems described above, the present invention has an object to provide a knock control system for preventing an internal combustion engine from any damage by ensuring a fail-safe operation when a signal line is troubled, while minimizing the influences of noise and reducing the space and size for the ECU.

According to the present invention, as shown in FIG. 1, in a knock control system for an internal combustion engine, having knock deciding means having integrally packaged therein a knocking vibration detecting unit for detecting a knocking vibration in an internal combustion engine, and a knock deciding unit for deciding a knock on the basis of an output signal of the knocking vibration detecting unit; and knock control means made separate from the knock deciding means and communicating through a signal line with the knock deciding means for controlling the internal combustion engine on the basis of the decided knock result of the knock deciding means, the knock deciding unit is provided with intensity detecting means for detecting the intensity of the knock from the output signal of the knocking vibration detecting unit; and knocking intensity outputting means for outputting the knocking intensity from the intensity detecting means to the knock control means in combination with the change of the level of the signal line to the previous signal line level, and further knock control means is provided with knocking intensity reading means for reading the signal line level outputted from the outputting means;

memory means for storing the signal line level read by the reading means;

knocking intensity restoring means for restoring the knocking intensity in combination with the change in the signal line level just read, to the previous signal line level stored in the memory means;

control means for controlling an ignition timing in accordance with the restored result; and auxiliary control means for controlling the ignition timing to a predetermined retard angle in case of a combination in which the read signal line level is unchanged from the previous signal line level.

Thus, the knock occurring in an internal combustion engine is detected by the knocking vibration detecting unit, and its intensity is accordingly detected by the intensity detecting means.

Then, the knocking intensity is outputted by the output means in combination with the change of the signal line level from the previous signal line level, and this signal line level is read by the reading means.

Then, this read signal line level is stored by the memory means, and the knocking intensity is restored by the restore means in combination with the change of the read signal line level stored in the memory means to the previous signal line level.

In accordance with this restored result, the ignition timing is controlled to reduce the knock.

On the other hand, if the output means or the signal line is troubled, the combination is such that the signal line level of this time is unchanged from the previous signal line level, and the ignition timing is controlled to a retarded angle to reduce the knock.

Since the influences of the noises on the connection lines between the knocking vibration detecting unit and the knock detecting micom are eliminated, according to the present invention, there can be attained an excellent effect that the knock can be accurately detected while reducing the space for the ECU.

Moreover, if the signal line for transmitting the detected knock result is troubled, their output level is unchanged to effect a predetermined retard angle control. There can be attained another excellent result that, even if a knock occurs at the troubled time of the signal line when the detected knock result cannot be transmitted, the retard angle control can be executed without fail to prevent the internal combustion engine from any damage due to the knock. Still moreover, since the communication of the detected knock result can be realized through the single signal line, there can be attained a further excellent effect that the knock deciding means having the knock vibration detecting unit and the knock detecting micom packaged integrally therewith can be small-sized.

DETAILED DESCRIPTION OF THE PREFERRED EMBODIMENTS

Figure 2:
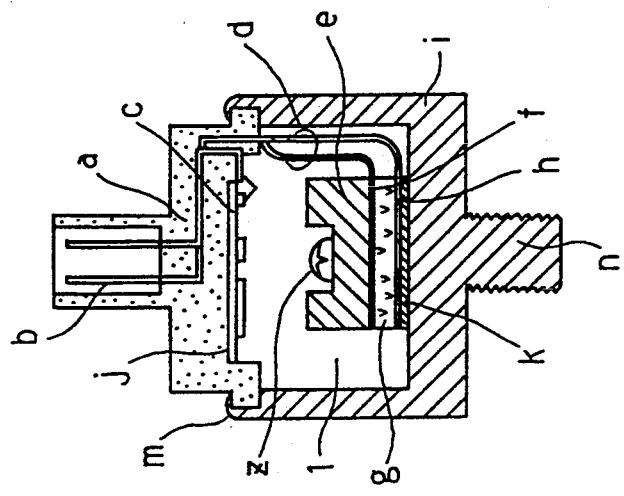
FIG. 2 is a internal showing a schematic construction of the knock deciding means in one embodiment of the present invention.

One embodiment of the present invention will be described in the following with reference to the drawings. FIG. 2 is a schematic diagram showing the overall construction of knock deciding means. Letter a designates a top cover which is molded of an insulating resin integrally with a connector. A terminal b is also integrally molded in a buried manner. In an inner bottom j of the top cover a, there is fixed a knock detecting circuit c acting as the knock deciding unit. A weight e, an electrode f, a piezoelectric element g, an electrode h and an insulating sheet k constituting a knocking vibration detecting unit together are fixed in a metallic casing i by means of a screw z. The knock detecting circuit c and the terminal b are connected by the wire bonding method or the like. Moreover, the piezoelectric element f has its output and ground (GND) connected through the electrodes f and h with leads d and through the terminal b with the knock detecting circuit c. The casing i has its open end m caulked to fix the top cover a. Moreover, the casing i is mounted on a cylinder block of an internal combustion engine at its threaded portion n which is formed to project from the outer bottom of the casing i.

Figure 3:
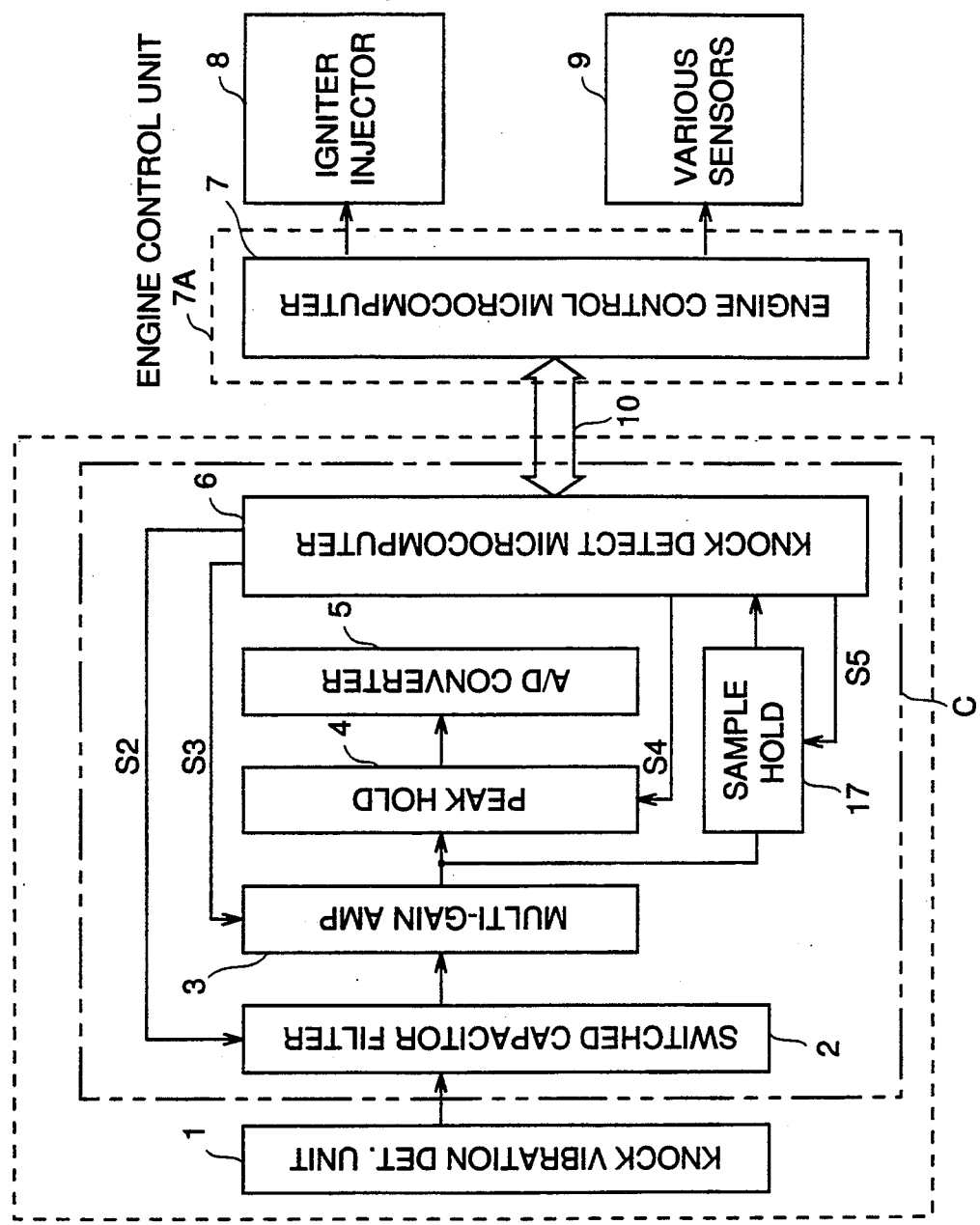
FIG. 3 is a block diagram showing one embodiment of the present invention.

FIG. 3 is a block diagram showing the overall construction including the knock deciding means. Reference numeral 1 designates the knocking vibration detecting unit which is made of a piezoelectric element or the like, for example, as described above. If the internal combustion engine knocks, the knocking vibration detecting unit 1 detects mechanical vibrations corresponding to the knock. And, the aforementioned knock detecting circuit c is composed of a switched capacitor filter 2, a multi-gain amplifier 3, a peak hold circuit 4, an A/D converter 5, a knock detecting micom 6 and a sample hold circuit 17.

A detection signal from the knocking vibration detecting unit 1 is fed to the switched capacitor filter 2, which filters out the noise component of the detection signal to extract a signal having a frequency component corresponding to the vibration at the time when the internal combustion engine knocks.

Figure 4:
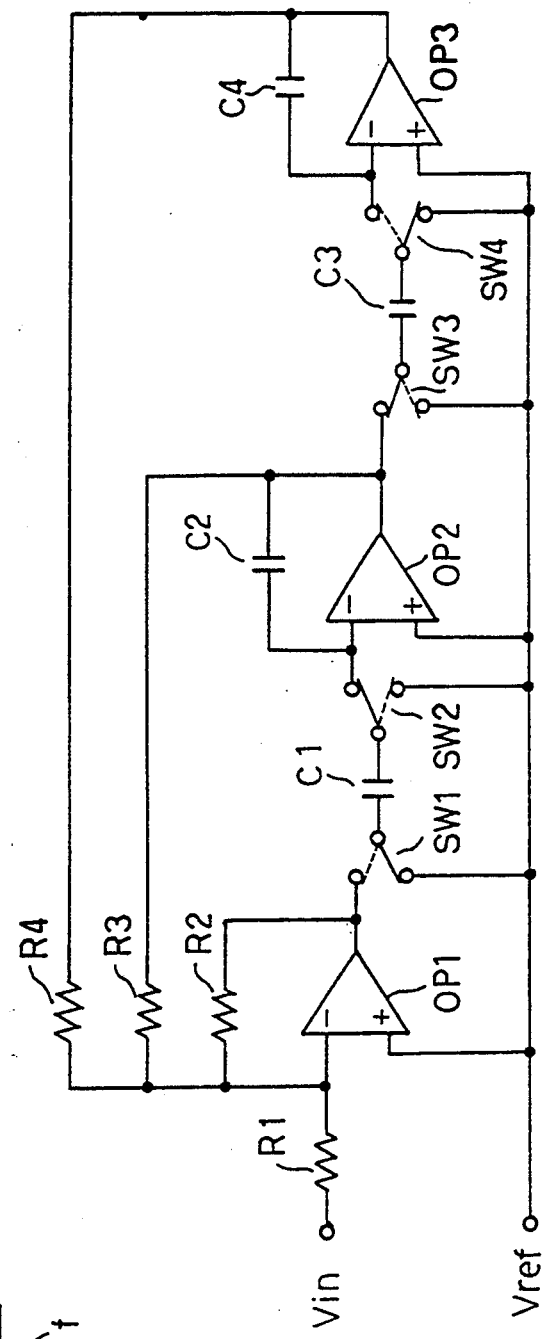
FIG. 4 is an electric circuit diagram showing a specific construction of the switched capacitor filter in the aforementioned embodiment.

The switched capacitor filter 2 has a specific construction, as shown in FIG. 4. The switched capacitor filter 2 used in the present embodiment is a secondary one. Specifically, the switched capacitor filter 2 is composed of condensers C1, C2, C3 and C4, switching elements (e.g., field effect transistors: FET) SW1, SW2, SW3 and SW4, and operation amplifiers OP1, OP2 and OP3. Resistors R1, R2, R3 and R4 are adjust resistors for changing the characteristics of the switched capacitor filter 2.

In the switched capacitor filter 2, the switching elements SW1 to SW4 are changed over (or switched) with a specific frequency between the positions, as indicated by solid lines and broken lines, to realize a kind of resistor functioning as a filter. If C1=C2 and C2=C4 in FIG. 4, a filter center frequency fO, a filter gain H and a filter value Q are expressed as follows:

$$f_0 = \frac{f_{CLK}}{2\pi \times C2/C1} \times \frac{R_2}{R_4};$$ [Relations 1]

($2\pi \times C2/C1 = 100$ in the present embodiment)

$$H = -\frac{R_3}{R_1}; \text{ and}$$

$$Q = \frac{R_2}{R_4} \times \frac{R_3}{R_2}.$$

Here, the frequency fCLK is that of a signal for switching the individual switching elements SW1 to SW4 and is controlled by a switching drive signal S2 of the knock detecting micom 6, as shown in FIG. 3. Letter $V_{in}$ designates an input of the switched capacitor filter 2, and letters Vref designate a reference voltage of the switched capacitor filter and is set in the present embodiment to one half of the supply voltage of the operation amplifiers OP1 to OP3. The adjust resistors R1 to R4 have their values adjusted by the trimming.

Figure 5:
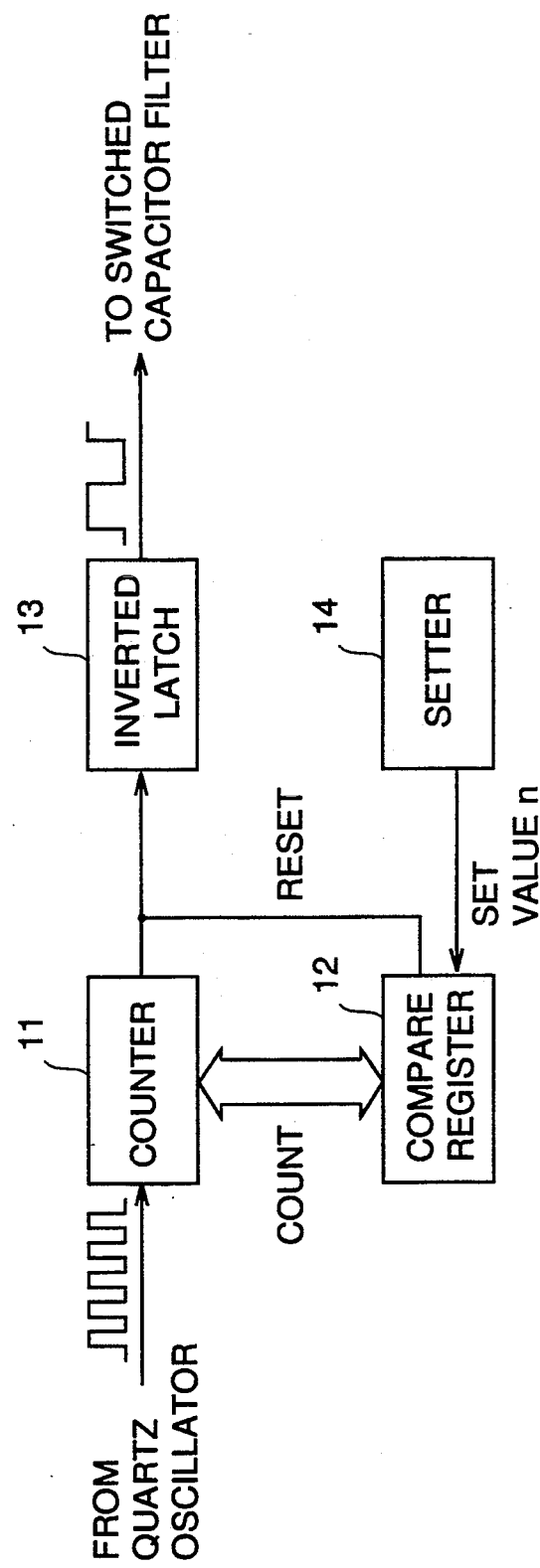
FIG. 5 is an electric circuit diagram showing a switching drive frequency setting circuit of the aforementioned switched capacitor filter.

The switching drive signal frequency fCLK is set, as shown in FIG. 5, by a counter 11, a compare register 12, an inversion latch circuit 13 and a setter 14 all in the knock detecting micom 6.

Figure 6:
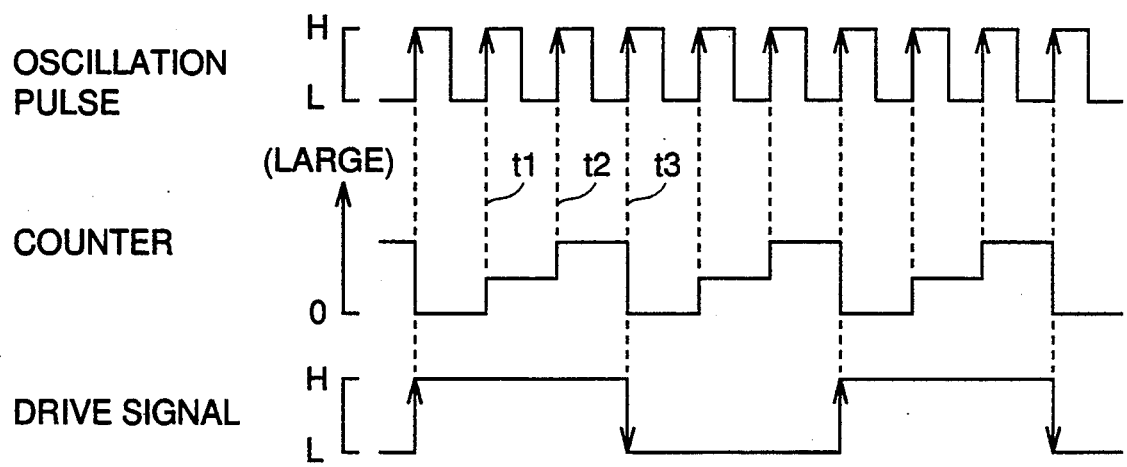
FIG. 6 is a waveform chart of individual portions for explaining the operations of the aforementioned switching drive frequency setting circuit.

The counter 11 receives a pulse signal of 4 MHz from a quartz oscillator. And, the counter 11 has its counted value incremented by "1" at each rising edge of the pulse signal, as shown in FIG. 6. The setter 14 sets a number n corresponding to a number for the oscillating signal (or pulse signal) to be divided, and the number is set to n=3 in the present embodiment. The compare register 12 compares the counted value of the counter 11 and the set value n of the setter 14, to reset the counted value of the counter 11 (to 0) if the compared values are equal. The inversion latch circuit 13 generates and outputs the drive signal which is to be inverted each time the counter 11 is reset, as shown in FIG. 5. The switched capacitor filter 2 has its characteristics determined from the Equations 1 to fO=6.7 KHz, H=−1 and Q=10 (or 20 dB) if the adjust resistor is adjusted, as follows:

$$\frac{R_2}{R_4} = 1; \frac{R_3}{R_1} = 1; \text{ and } \frac{R_3}{R_2} = 10.$$ [Relations 2]

The signal corresponding to the knocking component from the switched capacitor filter 2 is fed to the multi-gain amplifier 3.

Figure 7:
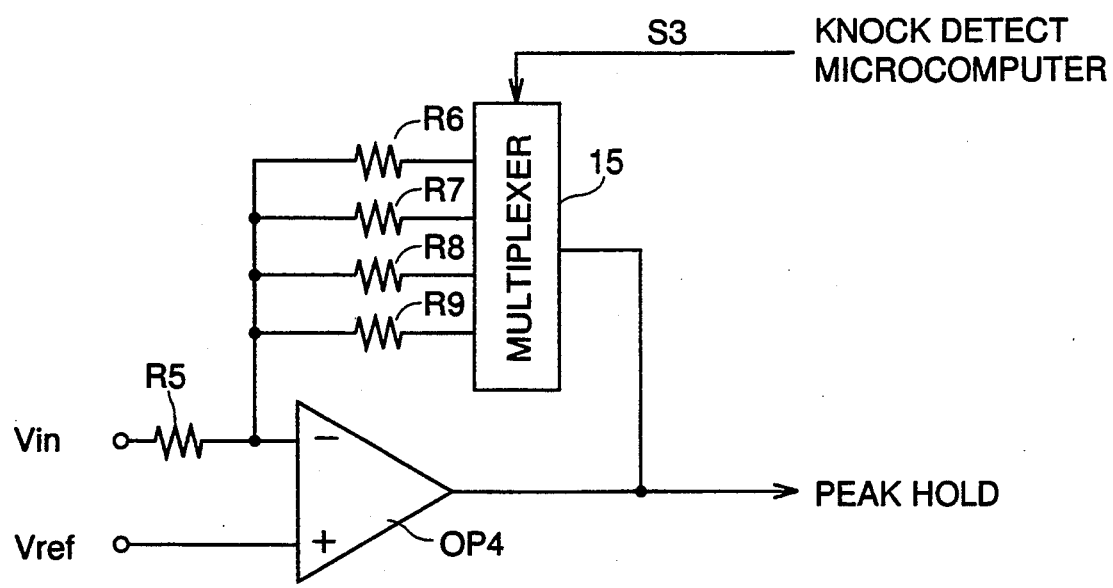
FIG. 7 is a electric circuit diagram showing a construction of a multi-gain amplifier in the aforementioned embodiment.

This multi-gain amplifier 3 is composed, as shown in FIG. 7, resistors R5 to R9, the operation amplifier OP4 and a multiplexer 15. The multi-gain amplifier 3 has its amplification factor determined at the ratio of the resistor R5 to the resistors $R_6$ to R9, and a resistor having the optimum gain is selected from the resistors $R_6$ to $R_9$ by the multiplexer 15 which is controlled by a gain control circuit S3 coming from the knock detecting micom 6. Moreover, the multiplication factor of the multi-gain amplifier 3 is set to a power of 2 (e.g., R7/R6=2, R8/R7=2, and R9/R8=2).

The signal multiplied by the multi-gain amplifier 3 is fed to the peak hold circuit 4. This peak hold circuit 4 holds the peak of a knock deciding interval signal S4 of the knock detecting micom 6 only if the signal S4 is at the high level. This peak hold value of the peak hold circuit 4 is fed to the A/D converter 5. On the other hand, the signal amplified by the multi-gain amplifier 3 is fed through the sample hold circuit 17 to the knock detecting micom 6. This knock detecting micom 6 subjects the peak hold value of the peak hold circuit 4 by the A/D converter 5 and fetches the converted value so that the knock deciding operation is executed to decide the knock on the basis of the A/D converted value. This decided knock result is fed through a signal line 10 to an engine controlling micom 7 of an engine control unit 7A constituting the knock control means.

Figure 8:
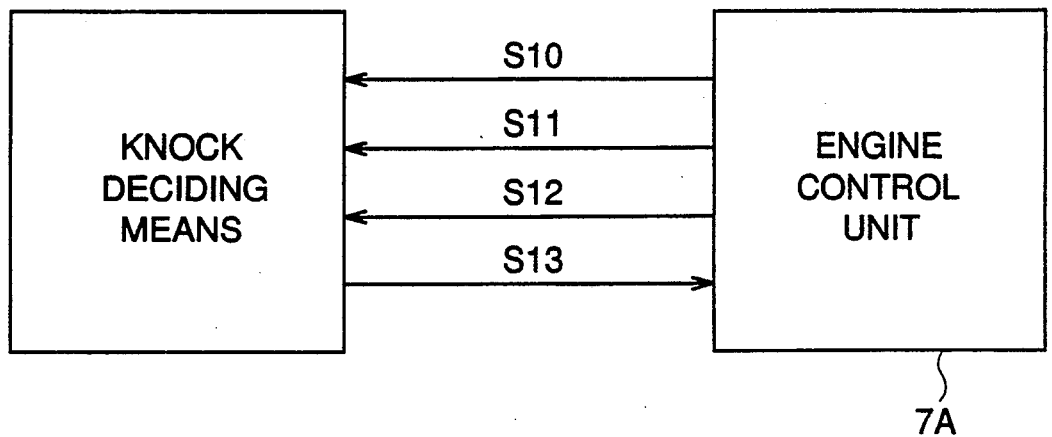
FIG. 8 is a block diagram showing the status of signal lines between the knock deciding means and an engine control unit of the aforementioned embodiment.

In the present embodiment, the signal line 10 is composed, as shown in FIG. 8, of a power line S10 for activating the knock deciding means, a ground line S11, a reference signal line S12 for timing the knock detecting micom, and a knock deciding signal line S13 for feeding the decided knock result from the knock detecting micom to the engine controlling micom 7.

On the basis of the knock decision signal from the aforementioned knock detecting micom 6 and the detected signals from various sensors 9 including a crank angle sensor, a pressure sensor and a coolant temperature sensor, the engine controlling micom 7 calculates an ignition timing, a fuel ignition rate and the like to control a control object 8 such as an igniter or an injector in accordance with the calculated result.

Figure 9:
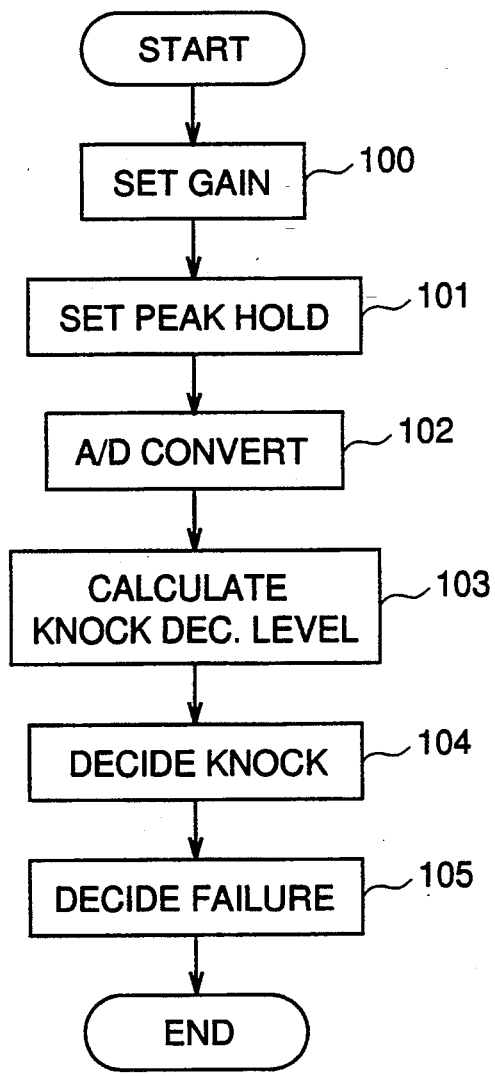
FIG. 9 is a flow chart showing a knock deciding operation to be executed in a knock detecting micom in the aforementioned embodiment.

FIG. 9 is a flow chart showing the knock deciding routine to be executed in the aforementioned knock detecting micom 6.

First of all, at Step 100, the amplification factor of the multi-gain amplifier 3 is decided. At Step 101, the peak holding start and end, i.e., the knock deciding interval is set. Specifically, the reference signal line S12 from the engine controlling micom 7 transmits a signal falling at 10° C. A of the BTDC (i.e., Before Top Dead Center), for example, to calculate the number of engine revolutions from the previous fall to the present fall.

Then, on the basis of the data of this revolution number and the signal of the reference signal line S12, a proper knock deciding interval, e.g., ATDC 10° C. A to 60° C. A is calculated. If the knock deciding interval is thus calculated, the peak hold of the peak hold circuit 4 is set to start in a manner to correspond to the starting time of that knock deciding interval and to end in a manner to correspond to the ending time of the knock deciding interval.

Next, at Step 102, the peak hold value of the peak hold circuit 4 is subjected to an A/D conversion by the A/D converter 5 to produce an A/D converted value Vpeak, and the operation of a knock deciding level VLEV is executed at Step 103 on the basis of the A/D converted value Vpeak. The decision level $V_{LEV}$ is calculated, as follows.

RELATION 3

$V_{LEV} = K \times V_{mean}$.

Here, letter K designates a constant determined on the basis of the running conditions of the engine, and letters Vmean designate a background level calculated on the basis of the A/D converted value Vpeak.

At Step 104, the knock is decided by comparing the knock deciding level $V_{LEV}$ and the A/D converted value Vpeak. At Step 105, the failure of the knocking vibration detecting unit 1 is decided. The detailed flow chart for deciding the failure will be described hereinafter.

Figure 10:
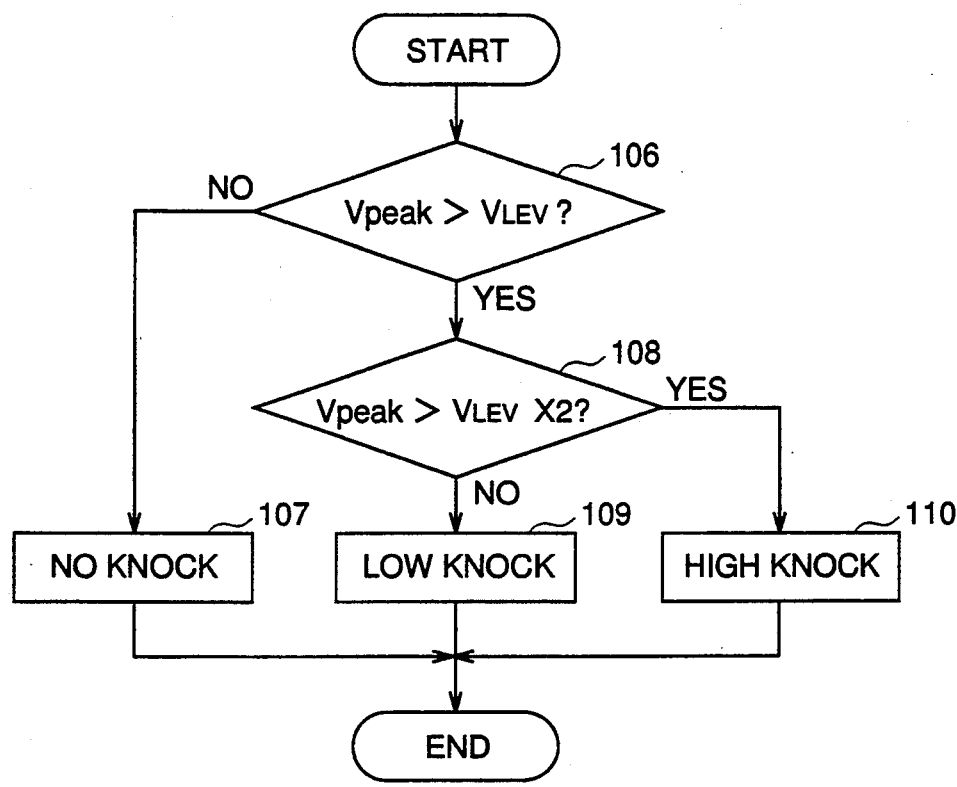
FIG. 10 is a flow chart showing a knock deciding method to be executed in a knock detecting micom in the aforementioned embodiment.

FIG. 10 is a flow chart showing the knock deciding method. At Step 106, the A/D converted value Vpeak and the knock deciding level or reference level or reference level $V_{LEV}$ are compared. If $Vpeak \leq V_{LEV}$, it is decided at Step 107 that "there is no knock".

If $Vpeak > V_{LEV}$, the A/D converted value Vpeak is compared at Step 108 with the twice value $V_{LEV} \times 2$ of the knock deciding level $V_{LEV}$. If $Vpeak \leq V_{LEV} \times 2$, it is decided at Step 109 that "the knock is low or light". If $Vpeak > V_{LEV} \times 2$, it is decided that "the knock is high or heavy".

Here will be described the method of transmitting the decided knock result from the knock detecting micom 6 to the engine controlling micom 7.

Figure 11:
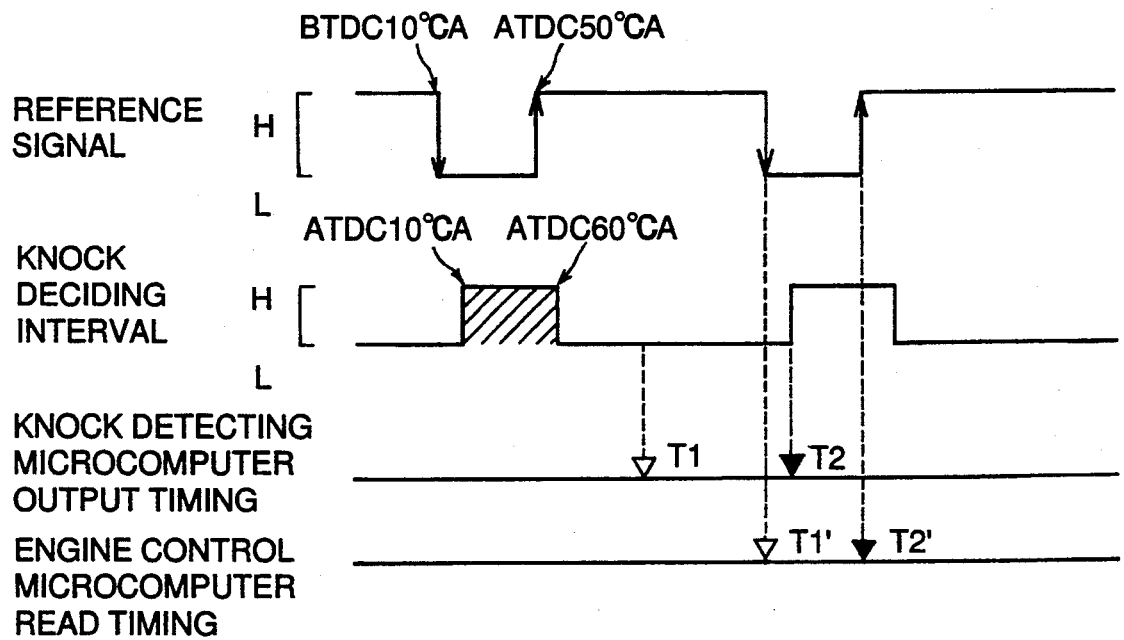
FIG. 11 is a timing chart for explaining the communication of the decided knock result in the aforementioned embodiment.

The communications of the decided knock result are caused to express the decided knock result by using the knock deciding signal line S13 shown in FIG. 8, in combination with a high level "1" and a low level "0"at two timings T1 and T2, as shown in FIG. 11. On the other hand, the engine controlling micom 7 is equipped with a RAM for storing the output voltages of the knock deciding signal line S13.

First of all, the decided knock result output timing of the knock detecting micom 6 and the decided knock result read timing of the engine controlling micom 7 will be described with reference to FIG. 11.

In the knock detecting micom 6, the result that the knock is decided on the basis of the A/D converted value Vpeak detected in the hatched knock deciding interval outputs a first signal at the timing T1 after the failure decision and a second signal at the timing T2 immediately after the start of the knock deciding interval of the subsequent ignition.

On the other hand, the engine controlling micom 7 reads the first signal of the decided knock result at a falling (of BTDC 10° C. A) timing T1' of the reference signal and a second signal of the decided knock result at a falling (of ATDC 50° C. A) timing T2' of the reference signal.

Figure 12:
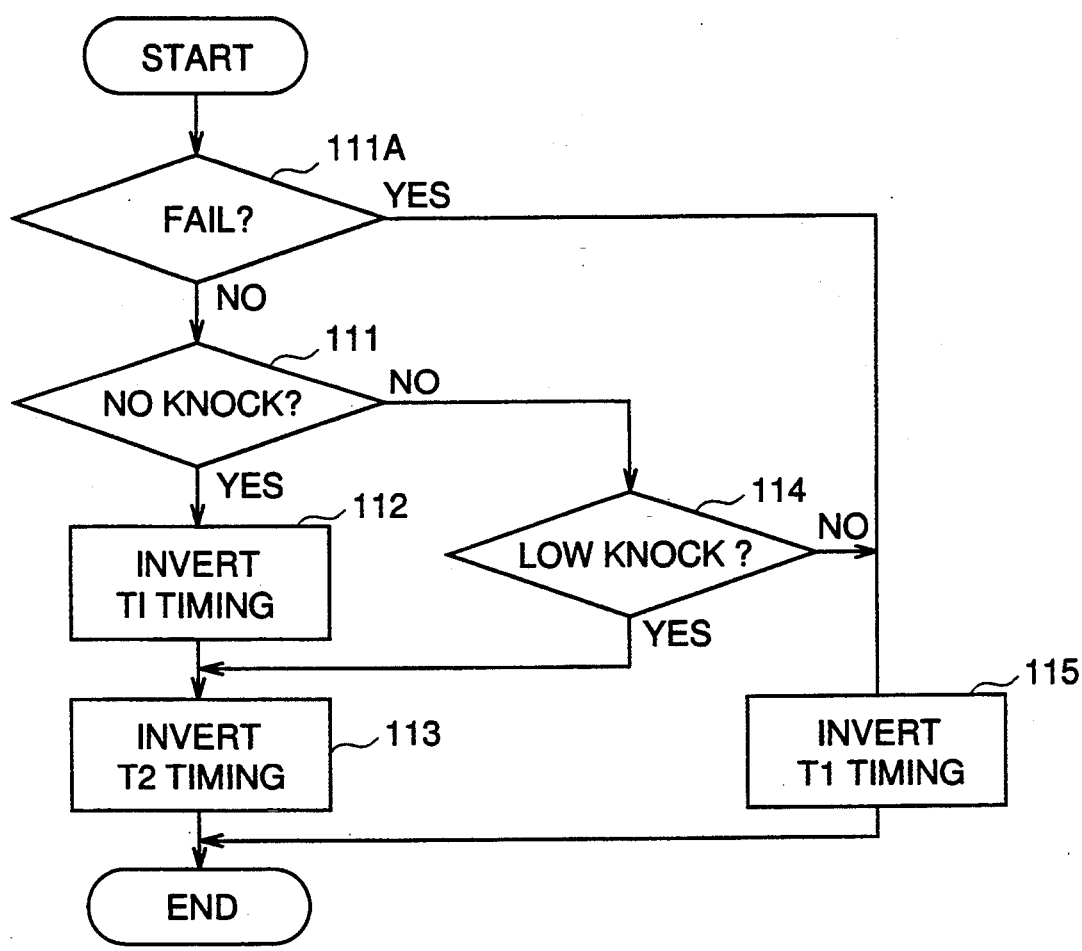
FIG. 12 is a flow chart showing a decided knock result outputting method to be executed in a knock detecting micom in the aforementioned embodiment.

Here will be described the method of outputting the decided knock result in the knock detecting micom 6 will be described with reference to FIG. 12.

At Step 111, it is decided whether or not the decided knock result of FIG. 10 is the presence of a knock. If it is decided that there is no knock, the inverted value of the previous timing T2 output value is outputted at the timing T1. If the previous output value is 0, for example, the value 1 is outputted.

At Step 113, the inverted value of the previous timing T1 output value is outputted at the timing T2. If it is decided at Step 111 that the decided knock result of FIG. 10 is the presence of a knock, it is decided at Step 114 whether or not the knock is low. If the knock is low, the inverted value of the previous timing T1 output value is outputted at Step 113 at the timing T2.

On the other hand, if the decided knock result decided that the knock is not low, i.e., high, the inverted value of the previous timing T2 output value is outputted at Step 115 at the timing T1.

Thus, the knock detecting micom 6 is abnormal if the output values at the timings T1 and T2 are at the same values as the previous ones.

On the other hand, if a failure is decided at Step 105 of FIG. 9, the routine advances from Step 111A to Step 115 so that the outputting method is identical to that for the high knock. The combination of the output values at the timings T1 and T2 for the decided knock result described above is as follows.

TABLE 2

| | Decided Result | | | |
|---|---|---|---|---|
| Output Timing | No | Low | High or Fail of 1 | Fail of 2 |
| T1 | Inverted Output | Same Output | Inverted Output | Same Output |
| T2 | Inverted Output | Inverted Output | Same Output | Same Output |

Figure 13:
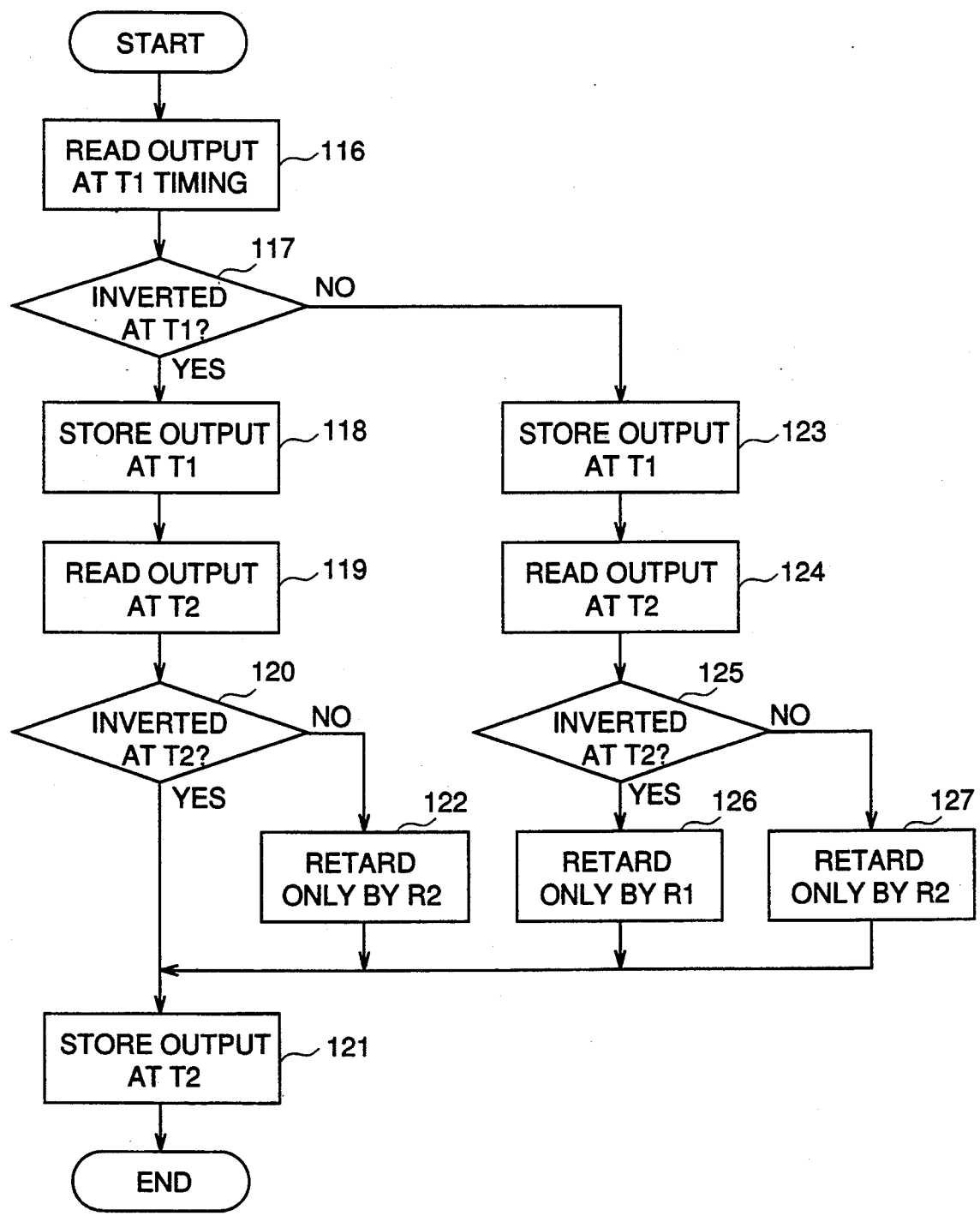
FIG. 13 is a flow chart to be used for explaining the operation of an engine controlling micom of the aforementioned embodiment.

Here will be described the operation of the engine controlling micom 7 with reference to FIG. 13.

First of all, at Step 116, the output value of the knock detecting micom 6 at the timing T1 is read through the knock deciding signal line S13. At Step 117, the previous timing T2 output value stored in the RAM and the present timing T1 output value are compared to decide whether or not the output value is inverted at the present timing T1.

If the output value of the knock detecting micom 6 at the timing T1 is inverted, the output value at the timing T1 is stored at Step 118 in the RAM. At Step 119, the output value at the timing T2 is then read through the knock deciding signal line S13. At Step 120, the previous timing T1 output value stored in the RAM and the present timing T2 output value are compared to decide whether or not the output value is inverted at the present timing T2. If the output value at the timing T2 is inverted, it is stored at Step 121 in the RAM.

If the output value at the timing T2 is not inverted at Step 120, that is, if the inversion occurs at the timing T1 but not at the timing T2, the decided knock result is a high knock, and a knock retard angle is then increased by R2 at Step 122. Here, the value R2 is set to 1° C. A, for example.

On the other hand, if it is decided at Step 117 that the output value at the timing T1 is not inverted, the output value at the timing T1 is stored at Step 123 in the RAM, and the output value at the timing T2 is read at Step 124 through the knock deciding signal line S13. It is then decided at Step 125 whether or not the output value at the timing T2 is inverted.

If the output value at the timing T2 is inverted, that is, if the output value is not inverted at the timing T1 but at the timing T2, the decided knock result is a low knock, and the knock retard angle is then increased by R1 at Step 126. Here, the value R1 is set to 0.5° C. A, for example.

If it is decided at Step 125 that the output value at the timing T2 is not inverted, that is, if the inversion occurs neither at the timing T1 nor at the timing T2, the knock detecting micom 6 is troubled, and the knock retard angle is then increased by the value R2 at Step 127.

After the knock retard angles have been determined at Steps 122, 126 and 127, the present routine is then ended by storing the output value at the timing T2 121 in the RAM at Step 121.

As has been described above, the retard angle for each knock is set according to the magnitude of the knock. Specifically, the relation between the retard angles R2 and R1 for each of the high and low knocks is expressed, as follows.

RELATION 4

$R_2 > R_1$.

In the present embodiment, the ignition timing is determined by determining the knock retard angle by the use of the retard angle (R2 or R1) for each knock thus according to the magnitude of the knock, by retarding a basic ignition timing ABASE determined according to the number of revolutions, an intake vacuum or the like, for each ignition by the knocking retard angle, and by decreasing the knocking retard angle by a predetermined amount for each predetermined time period.

According to the present embodiment, even if any of the knock deciding signal line S13, the output port of the knock detecting micom 6 and the input port of the engine controlling micom 7 is troubled so that the decided knock result of the knock detecting micom 6 is not transmitted to the engine controlling micom 7, the reading of the decided knock result of the engine controlling micom 7 is identical to that of the case in which the output values at the timings T1 and T2 are not inverted, so that the retard angle control can be executed without fail to prevent any damage of the internal combustion engine.

Moreover, the outputting method is identical to that for a high knock if a failure is decided by the knock detecting micom 6, and the ignition angle is retarded to the same extent as that for a high knock by the engine controlling micron 7, if the knock detecting micom 6 is troubled. As a result, even if either the knocking vibration detecting unit 1 or the knock detecting micom 6 is troubled, the retard angle control can be executed without fail to prevent any damage of the internal combustion engine. At the same time, the decided knock result and the decided failure result can be transmitted through the single signal line.

Here, in order to execute the retard angle control promptly in case any of the knock deciding signal line S13, the knock detecting micom 6, the input port of the engine controlling micom 7 and the knocking vibration detecting unit 1 is troubled, the ignition timing may be set to a safe value for preventing the damage of the internal combustion engine, by retarding the angle to a predetermined extent if it is decided by the engine controlling micom 7 that the knock is high or if the decision of failure by the knock detecting micom 6 continues for predetermined ignitions.

The method of setting parameters relating to the knock decision to be used in the embodiment described above will be described in the following with reference to FIG. 14.

In the present embodiment, there are set as the parameters relating to the knock decision the four parameters: the knock deciding interval; the knock deciding constant K (as should be referred to Relation 2); the switching drive signal frequency $f_{CLK}$ of the switched capacitor filter 2; and the failure deciding level for deciding the failure.

The A/D input port 16 is a multiplexer to be controlled by an input port switching drive signal S18 and fed with the output signal of the peak hold circuit 4 and parameter signal S14 to S17 relating to the aforementioned four knock decisions. The knock detecting micom 6 switches the A/D input port 16 sequentially with the input port switching drive signal S18 to feed it to the A/D converter 5 thereby to read the A/D converted value. This control flow will be described in detail hereinafter.

Four pairs of resistors $R_{10}$ to $R_{17}$, in which every two paired resistors are connected in series between the power supply and the ground, so that the individual voltages divided by the two paired resistors are the knock deciding parameter signals S14 to S17. On the basis of the A/D converted values of those voltages, the knock detecting micom 6 sets the knock deciding parameters. The relations between the voltages and the knock deciding parameters are as follows.

TABLE 3

| Voltage | Parameters | | | Fail Decide |
|---|---|---|---|---|
| | Knock Decide | K | $f_{CLK}$ | |
| $0 V \leq V_{ADJ} < 1.5 V$ | 20° C. A | $K_1$ | 1/5 | $F_{LEV1}$ |
| $1.5 V \leq V_{ADJ} < 3 V$ | 30° C. A | $K_2$ | ¼ | $F_{LEV2}$ |
| $3 V \leq V_{ADJ} < 5 V$ | 40° C. A | $K_3$ | ⅓ | $F_{LEV3}$ |

The aforementioned values of the knock deciding interval are the crank angles from the fall of the reference signal to the start of the knock deciding interval. In the present embodiment, the knock deciding interval is set to ATDC 10° C. A to 60° C. A by setting the width of the knock deciding interval to 50° C. A, the falling timing of the reference signal to BTDC 10° C. A, the voltage $V_{ADJ}$ to $0V < V_{ADJ} < 1.5V$, and the knock deciding interval to ATDC 10° C. A to 60° C. A. The value of the switching drive signal frequency fCLK of the switched capacitor filter 2 is the division of frequency of the pulse signal of 4 MHz so that the division of frequency is set to 5, that is, the center frequency f0 of the switched capacitor filter 2 is set to 6.7 KHz by setting the voltage $V_{ADJ}$ to $0V \leq V_{ADJ} < 1.5V$.

Moreover, the resistors R10 and R17 are adjusted by the trimming.

Figure 1:
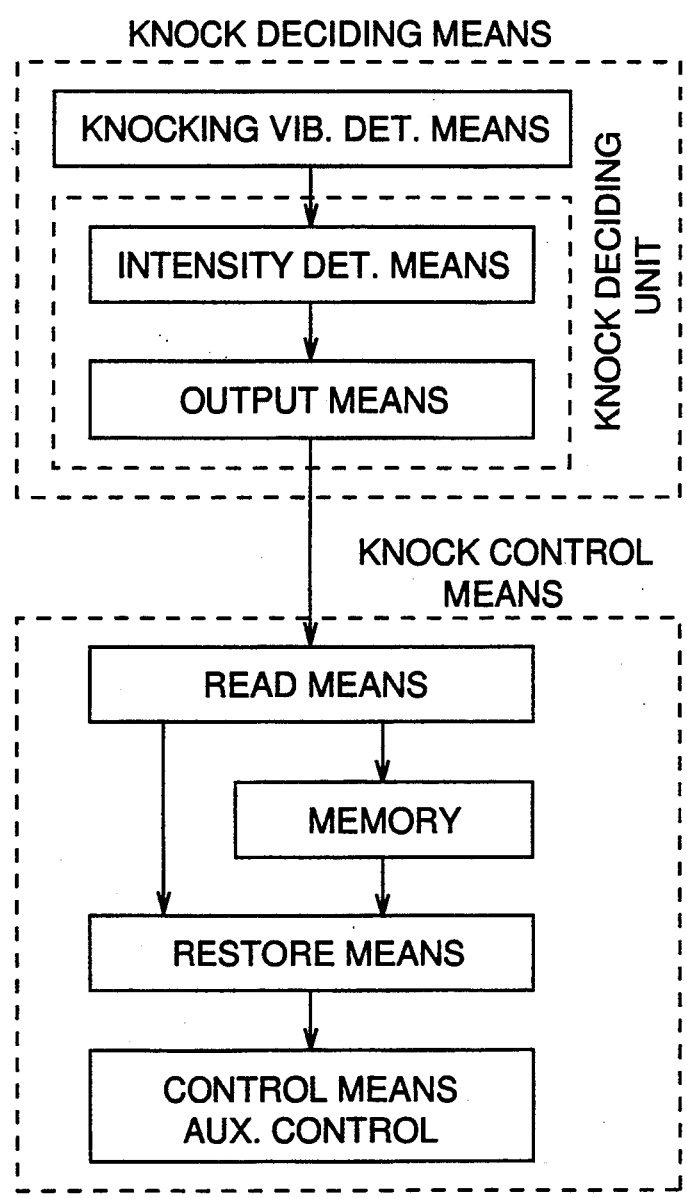
FIG. 1 is a block diagram corresponding to an overall construction of the present invention.

As described above, the parameters relating to the knock decision are changed by trimming the resistors R10 to R17, and the characteristics of the switched capacitor filter 2 are also changed by trimming the resistors R1 to R4 of FIG. 4, as has been described hereinbefore. The program change of the knock detecting micom 6 can be considerably reduced, and the patterns of the hybrid substrate can be shared when the knock deciding unit of FIG. 1 is integrated into a hybrid IC.

Another embodiment of the method of setting the parameters relating to the knock decision to be used in the present invention will be described with reference to FIG. 15. Four resistors R18 to R21 are connected in series between the power supply and the ground to constitute a resistor set, and this resistor set and the knock deciding parameter signal lines S14 to S17 are so connected that the knock deciding parameters may take values to be set by setting the three stages of voltage values of Table 3.

Figure 14:
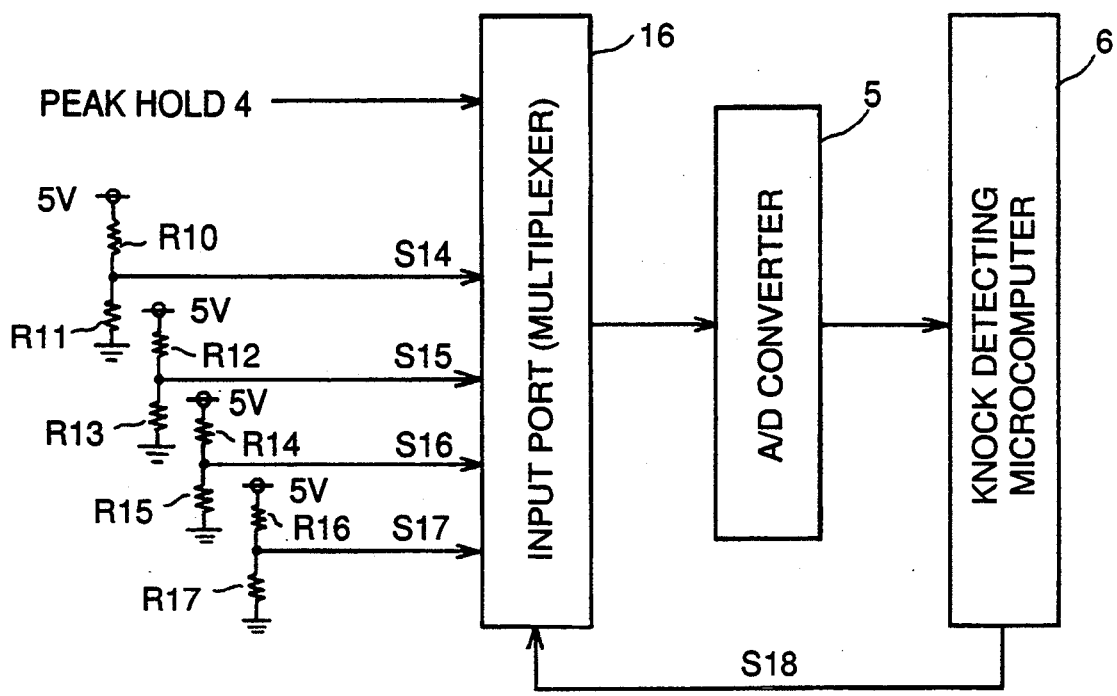
FIG. 14 is a block diagram for setting parameters relating to the knock decision to be used in the aforementioned embodiment.

With these settings, the knock deciding parameters can be changed by less resistors than those of the embodiment of FIG. 14, so that the knock deciding unit can be integrated into a small-sized hybrid IC. According to this method, however, the connecting points between the knock deciding parameter signal lines S14 to S17 and the set resistors R18 to R21 have to be changed, so that the hybrid substrate cannot have its pattern shared. Thus, the embodiment of FIG. 14 is effective when the area of the hybrid substrate is enough, but the embodiment of FIG. 15 is effective either when the area of the hybrid substrate is not enough or when the hybrid substrate is to be small-sized.

Figure 16:
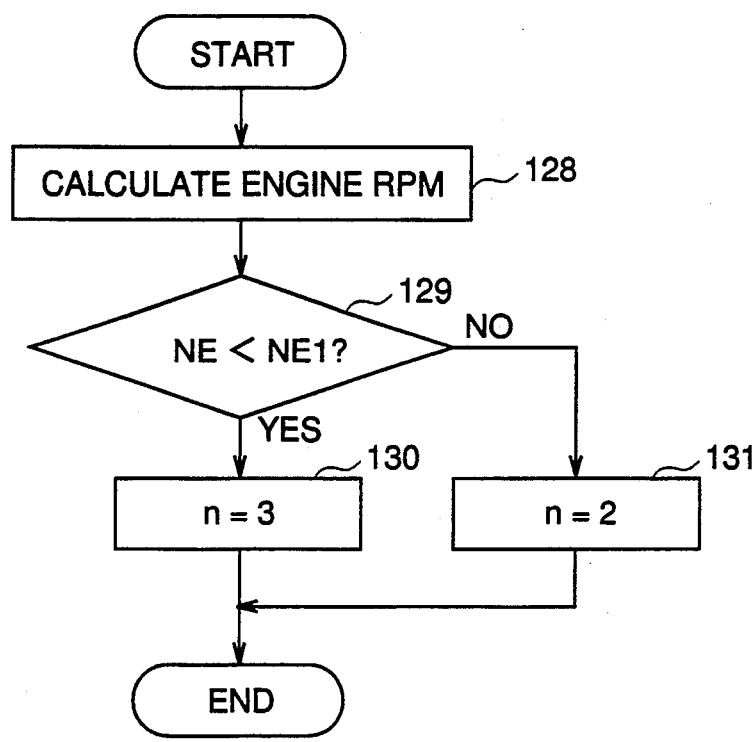
FIG. 16 is a flow chart for changing the switching drive frequency of the aforementioned switched capacitor filter.

With reference to FIG. 16, here will be described an embodiment to which is added a function to change the switching frequency of the switched capacitor filter 2 according to the running status of the engine. At Step 128, the knock detecting micom 6 causes its timer to measure the time period from the preceding fall to the present fall of the reference signal S12 and calculates the engine revolution number NE from the measured time. At Step 129, the engine revolution number NE is compared with a predetermined revolution number $NE_1$ (e.g., 4,000 rpm).

If the engine revolution number NE is smaller than the predetermined revolution number $NE_1$, the knock detecting micom 6 sets at Step 130 the setter 14 of FIG. 5 to n=3. If the engine revolution number NE is smaller than the predetermined revolution number NE1, the knock detecting micom 6 sets at Step 131 the setter 14 to n=2.

Moreover, when the setter 14 is set to n=3, the counter 11 of FIG. 5 increments the counted value by "1", as shown in FIG. 6 (to t1, t2 and t3, as shown in FIG. 6), in response to each rising edge of the pulse signal coming from the quartz oscillator. Moreover, if the compare register 12 compares the counted value of the counter 11 and the set value n (=3) of the setter 14 and finds that the two values are identical, the counter 11 has its counted value reset (=0) (to t3 of FIG. 6). At this reset timing, the inverted latch circuit 13 generates and outputs an inverted switching drive signal.

Thus for n=3, a switching drive signal of one-sixth of 4 MHz, i.e., 66.7 KHz is obtained.

Figure 17:
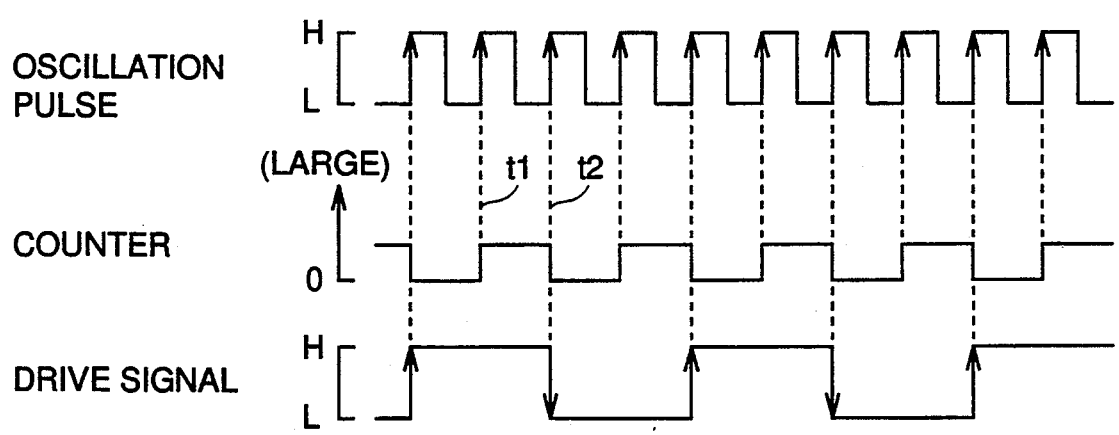
FIG. 17 is a waveform chart of individual portions for explaining the switching drive frequency change of the aforementioned switched capacitor filter.

In case the setter 14 is set to n=2, on the other hand, the counter 11 increments the counted value by "1", as shown in FIG. 17 (to t1 and t2, as shown in FIG. 17), in response to each rising edge of the pulse signal coming from the quartz oscillator. Moreover if the compare register 12 compares the counted value of the counter 11 and the set value n (=2) of the setter 14 and finds that the two values are identical, the counter 11 has its counted value reset (=0) (to t2 of FIG. 17). At this reset timing, the inverted latch circuit 13 generates and outputs an inverted switching drive signal.

Thus, for n=2, a switching drive signal of one-fourth of 4 MHz, i.e., 1 MHz is obtained.

The switching drive signal thus having its frequency divided is sent to the switched capacitor filter to switch the switching elements SW1 to SW4 of the switched capacitor filter 2. At this time, the switched capacitor filter 2 has its impedance and accordingly its filter characteristics changed by switching the switching frequency. Specifically, the switched capacitor filter 2 is given the center frequency of 6.7 KHz by the input of switching drive signal of 667 KHz and the center frequency of 10 KHz by the input of the switching drive signal of 1 MHz, as could be understood from Relations 2. In other words, the switched capacitor filter 2 is given the center frequency of 6.7 KHz, if the engine revolution number NE is smaller than the predetermined value NE1, and the center frequency of 10 KHz if the engine revolution number NE is larger than the predetermined value $NE_1$.

Therefore, in order that the system of the prior art may have a filter circuit prepared with a plurality of filters, the number of its components has to be equal to that of the filters, and a number of resistances and condenser capacities have to be set for the filter characteristics. In the present embodiment, however, an arbitrary filter can be realized even during the running of the engine without enlarging the circuit scale, and the system can cope with the knocking frequency, even if changed by the change in the status of the engine.

Next, here will be described an embodiment, to which is added a function to detect the ignited cylinder of a multi-cylinder engine thereby to switch the switching drive frequency of the switched capacitor filter 2 for each cylinder. For this function, there are connected with the knock deciding means a cylinder discriminating signal from the engine control unit 7A in addition to the signal lines S10 to S13 of FIG. 8, so that the cylinder can be discriminated by the added signal.

Figure 18:
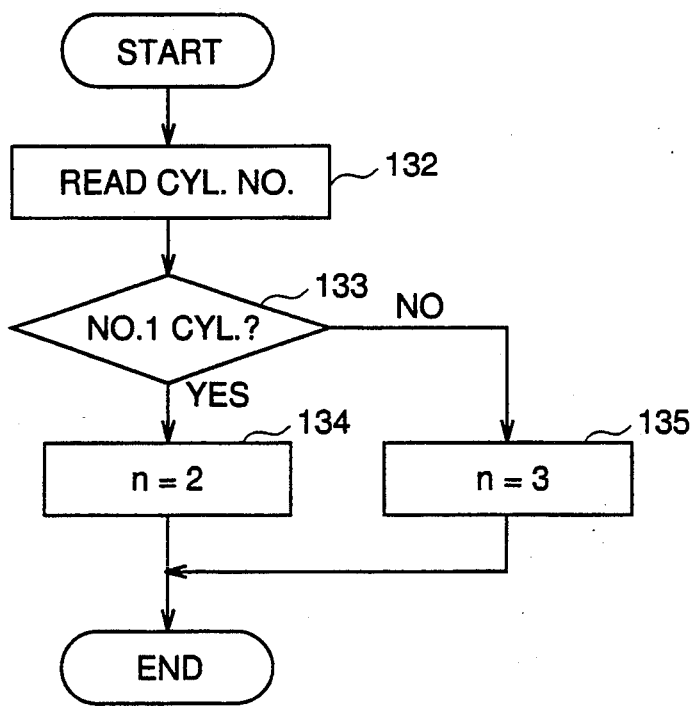
FIG. 18 is flow chart showing another embodiment for changing the switching drive frequency of the aforementioned switched capacitor filter.

The operation of the present embodiment will be described with reference to FIG. 18.

The knock detecting counter 6 reads the cylinder number in response to the cylinder discriminating signal at Step 132 and decides at Step 133 whether or not the cylinder is the first one. If the cylinder is the first one, the knock detecting micom 6 sets the setter to n=2 at Step 134. Otherwise, the knock detecting micom 6 sets the setter 14 to n=3 at Step 135.

In the present embodiment, the signal filtering frequency band of the filter 2 is switched depending upon whether or not the cylinder is the first one. Despite of this fact, however, the combination of the cylinders and the signal filtering frequency bands of the filter 2 can naturally be freely designed according to the engine characteristics.

Since many engines have different optimum signal filtering frequency bands for the cylinders, the knock detecting accuracy can thus be improved.

Figure 15:
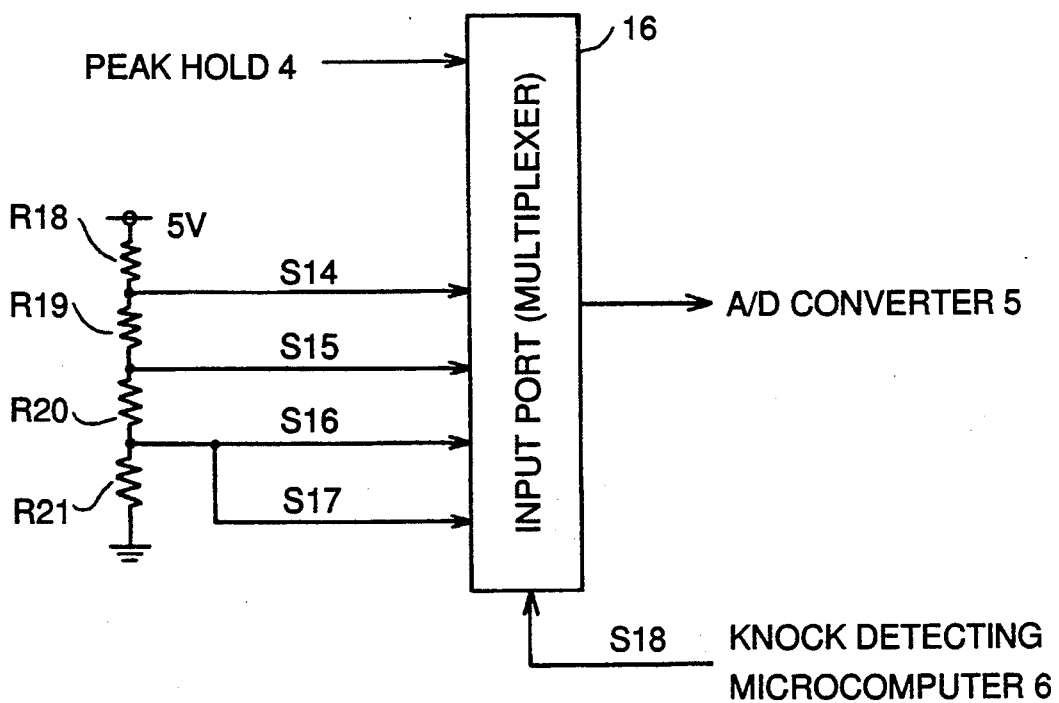
FIG. 15 is a block diagram showing another embodiment for setting parameters relating to the knock decision to be used in the aforementioned embodiment.

Although the knock deciding parameters are set by the adjust resistors in the embodiments of FIGS. 14 and 15, the data relating to the knock deciding parameters can be sent out from the engine controlling micom 7 through the signal line 10 to the knock detecting micom 6.

This modification of example will be described with reference to the signal waveform chart of FIG. 19, although the detailed control flow will be described hereinafter.

The knock detecting micom 6 initializes the routine, after the power supply has been turned ON, and the output allowing signal for allowing the output of the data relating the knock deciding parameters is sent through the knock deciding signal line S13 to the engine controlling micom 7. In the present embodiment, the output allowing signal is raised at the knock deciding interval starting timing (of ATDC 10° C. A) and is felled at the subsequent knock deciding interval starting timing.

If the engine controlling micom 7 reads the output allowing signal at the falling timing $t_1$ of the reference signal, it sets the transmission direction of the knock deciding signal line S13 to the output side and outputs the knock deciding parameter data sequentially by 2 bits at the timing $t_2$ immediately before the fall of the subsequent reference signal. The data to be outputted are as follows.

TABLE 4

| Issue Data | | outputting Order → Decide Parameters | | | |
|---|---|---|---|---|---|
| First | Second | No. 1 Decide Section | No. 2 K | No. 3 $f_{CLK}$ | No. 4 Level |
| 0 | 0 | 40° C. A | $K_1$ | ¼ | $F_{LEV}1$ |
| 0 | 1 | 30° C. A | $K_2$ | ¼ | $F_{LEV}2$ |
| 1 | 0 | 20° C. A | $K_3$ | 1/5 | $F_{LEV}3$ |
| 1 | 1 | 10° C. A | $K_4$ | 1/6 | $F_{LEV}4$ |
| → outputting Order | | | | | |

The values of the knock deciding parameters correspond to those of Table 3. The engine controlling micom 7 outputs the knock deciding parameters sequentially from the lefthand of Table 4.

After the output allowing signal has fallen, the knock detecting micom 6 sets the transmission direction of the knock deciding signal line S13 to the input side and reads one knocking deciding parameter data at the falling timings t3 and t4 of the subsequent reference signal thereby to set the knock deciding parameters. In FIG. 19, the knock detecting micom 6 reads the value "10" as the data of the knock deciding interval and sets the crank angle from the fall of the reference signal to the start of the knock deciding interval, to 20° C. A.

The knock detecting micom 6 reads the four knock deciding parameter data and sets, when the setting of the read knock deciding parameters is ended, the transmitting direction of the knock deciding signal line S13 to the output side, until the ordinary control is restored. The engine controlling micom 7 sets, after the four knock deciding parameter data have been outputted, the transmitting direction of the knock deciding signal line S13 to the input side, until the ordinary control is restored.

Next, the method of transmitting the knock deciding parameter data through the reference signal line S12 will be described with reference to the signal waveform chart of FIG. 20. The detailed control flow will be described hereinafter. The operation is identical to that of the foregoing embodiment before the engine controlling micom 7 reads the output allowing signal for allowing the output of the knock deciding parameter data, at the falling timing t1 of the reference signal.

When the engine controlling micom 7 reads the output allowing signal, it outputs the knock deciding parameter data sequentially by 2 bits, at the rising timing t2 (e.g., ATDC 50° C. A in the present embodiment) of the reference signal. However, the data outputted are returned, if at "0", to "1" at a timing t5 immediately before the fall of the reference signal. The outputting method is identical to that of the foregoing embodiment and accords to Table 4.

The knock detecting micom 6 read one knock deciding parameter data at the knock deciding interval ending timings t3 and t4 (e.g., ATDC 60° C. A) and sets the knock deciding parameters. In FIG. 20, like in FIG. 19, the knock detecting micom 6 reads the value "10" as the data of the knock deciding interval and sets the crank angle from the fall of the reference signal to the start of the knock deciding interval, to 20° C. A.

The knock detecting micom 6 reads the four knock deciding parameter data and is returned to the ordinary control when the setting of the read knock deciding parameters is ended. The engine controlling micom 7 is returned to the ordinary control after the four knock deciding parameter data have been outputted.

As described above, the change in the knock deciding parameters can be realized with neither using the adjust resistor (nor any change in the program of the knock detecting micom 6). Thus, the hybrid substrate can be small-sized when the knock deciding unit is integrated into a hybrid IC, and the knock deciding parameters can be freely set by the engine controlling micom 7.

Here, the individual embodiments thus far described have four kinds of knock deciding parameters and three or four adjusting stages, but the present invention should not be limited thereto. Nor should be limited the reading timings and the outputting timings.

Figure 21:
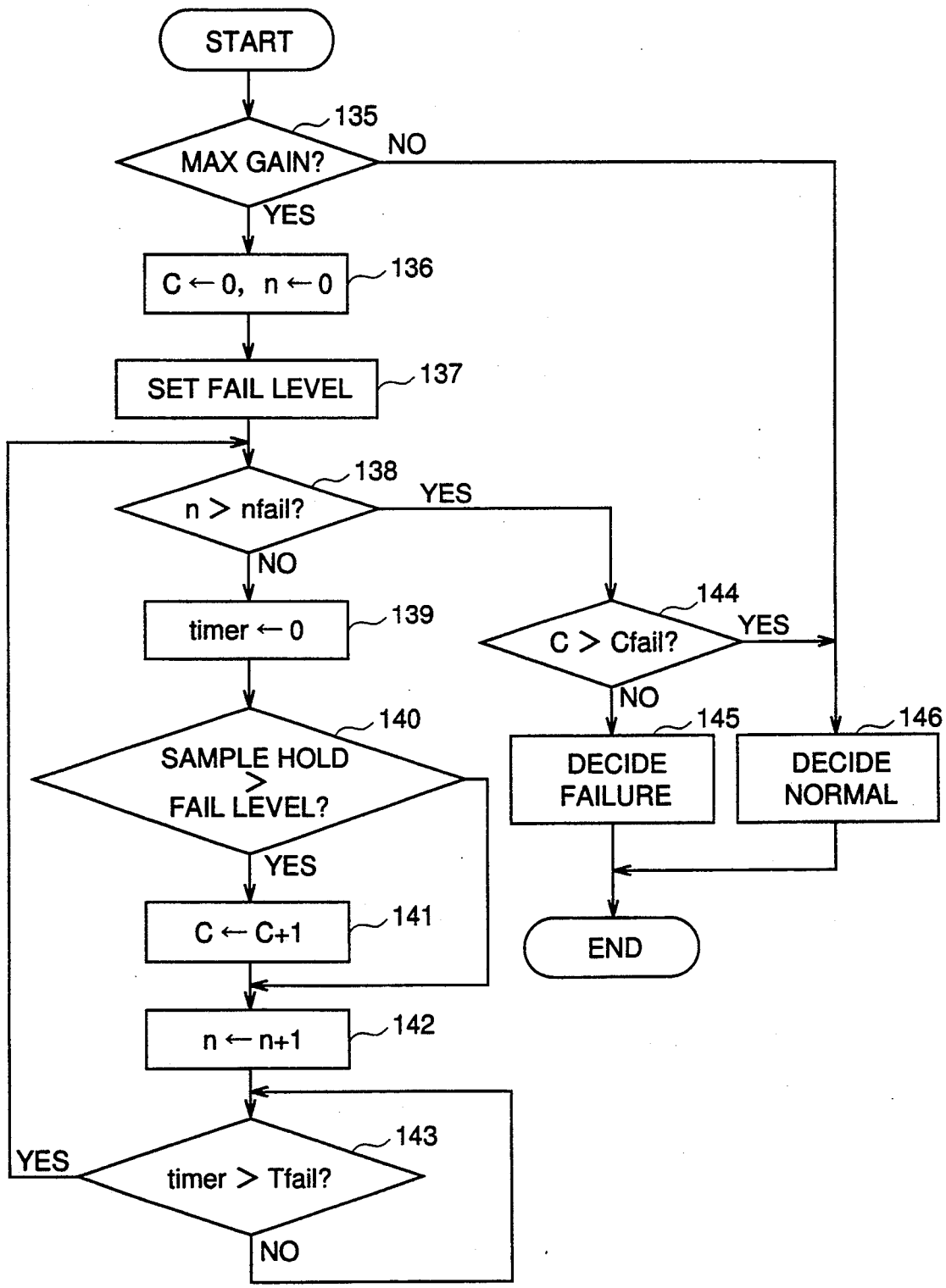
FIG. 21 is a flow chart for deciding a failure in the aforementioned embodiment.

FIG. 21 is a more detailed flow chart of the failure decision of Step 105 of FIG. 9. It is decided at Step 135 whether or not the multi-gain amplifier 3 is set to the maximum gain. If the answer is NO, it is decided at Step 146 whether or not the operation is normal. If the answer is YES, the routine advances to Step 136. At Step 136, the number C of times, when the sample hold value of the sample hold circuit 17 exceeds the failure deciding level, and the number n of comparisons between the sample hold value of the sample hold circuit 17 and the failure deciding level are set to 0. At Step 137, the engine revolution number is detected to read and set the failure deciding level from a one-dimensional map using the engine revolution number as a parameter.

Here, the failure deciding level may be at a constant value but may resort to a two-dimensional map of the engine revolution number and the load. At Step 138, it is decided whether or not the number of comparisons exceeds a predetermined number nfail. If the answer is NO, a timer Timer is reset to 0 to start at Step 139. Next, at Step 140, the sample hold value of the sample hold circuit 17 and the failure deciding level are compared. If the former exceeds the latter, the number is incremented at Step 141, and the comparison number n is incremented at Step 142.

At Step 143, it is decided whether or not the timer Timer has elapsed a predetermined time period Tfail. This lapse is awaited if the answer is NO, but the routine is returned to Step 138 if the answer is YES. If the comparison number exceeds the predetermined value nfail at Step 138, the routine advances to Step 144, at which it is decided whether or not the number C, in which the sample hold value exceeds the failure deciding level, exceeds a predetermined value Cfail. A failure is decided at Step 145 if the value Cfail is not exceeded, and the operation is decided to be normal at Step 146 if the same value is exceeded. Here, the predetermined time period Tfail is desirably set to less than one-fourth of the center frequency set in the switched capacitor filter 2.

Figure 22:
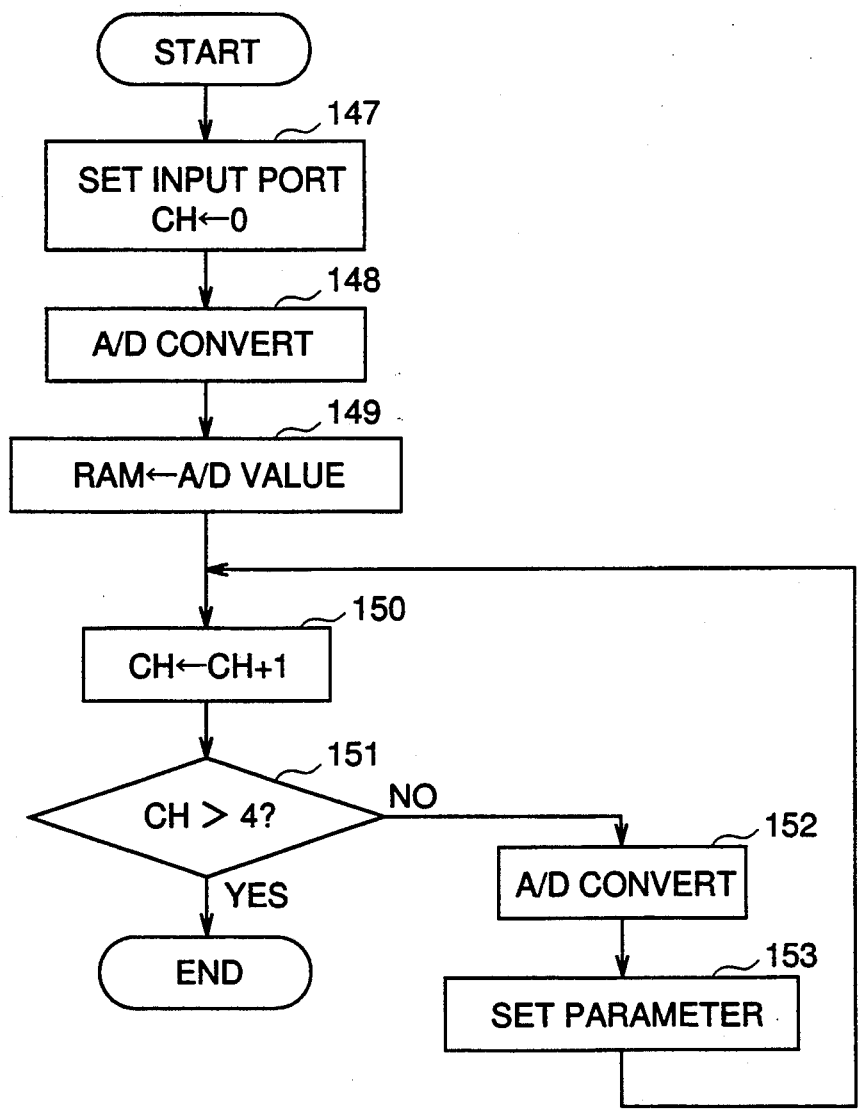
FIG. 22 is a flow chart showing a method of setting the knock deciding parameters in the aforementioned embodiment.

The method of setting the knock deciding parameters by the resistors, as shown in FIGS. 14 and 15, is shown in a flow chart in FIG. 22. At Step 147, the channel (CH) of the A/D input port 16 is set to 0 so that it may be the peak hold output. This peak hold output is subjected at Step 148 to the A/D conversion by the A/D converter 5, and this A/D converted value is stored at Step 149 in the RAM. Here will be enumerated the relations between the channels CH of the A/D input port 16 and the input signals in Table 5.

TABLE 5

| A/D Input Port CH | Input Signals |
| --- | --- |
| 0 | Peak Hold Output |
| 1 | Setting Voltage for Knock Deciding Section |
| 2 | Setting Voltage for Knock Deciding Level Constant K |
| 3 | Setting Voltage for Switching Drive Signal Frequency $f_{CLK}$ |
| 4 | Setting Voltage for Failure Deciding Level |

Next, the channel CH of the A/D input port 16 is incremented at Step 150, and it is decided at Step 151 whether CH>4 or CH≦4. If CH≦4, the channel CH of the A/D input port 16 is switched at Step 152 to the input signal according to Table 5 and is subjected to the A/D conversion. At Step 153, the A/D converted values are used to set the knock deciding parameters in accordance with Table 3. In CH> 4 at Step 151, on the other hand, this A/D conversion routine is ended.

Figure 19:
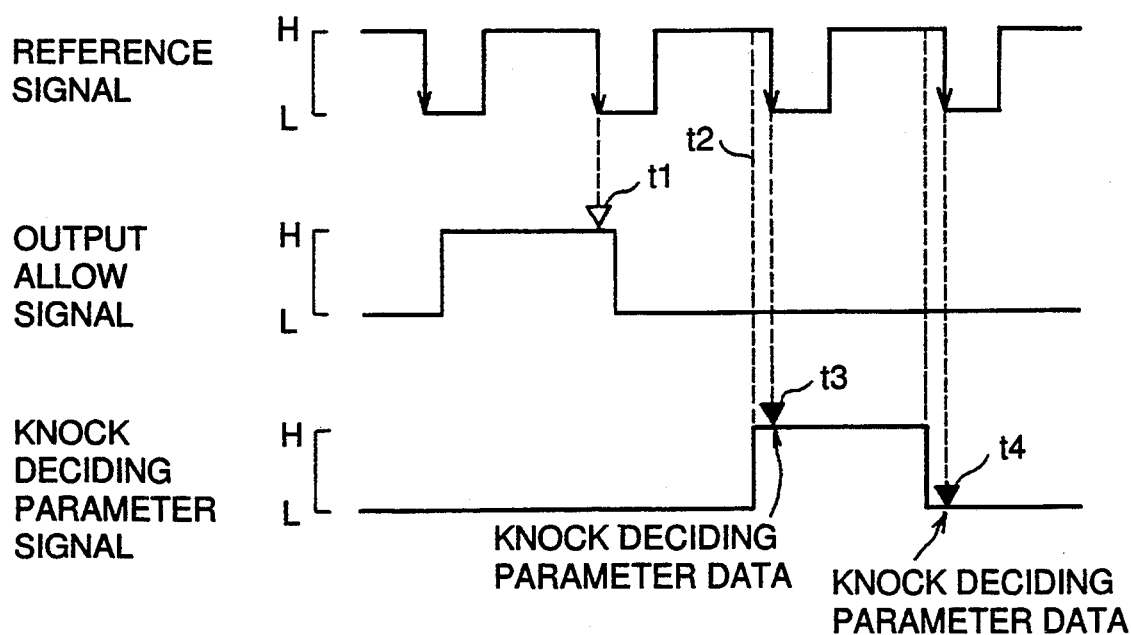
FIG. 19 is a timing chart showing a method of transmitting the knock deciding parameters in the aforementioned embodiment.
Figure 23:
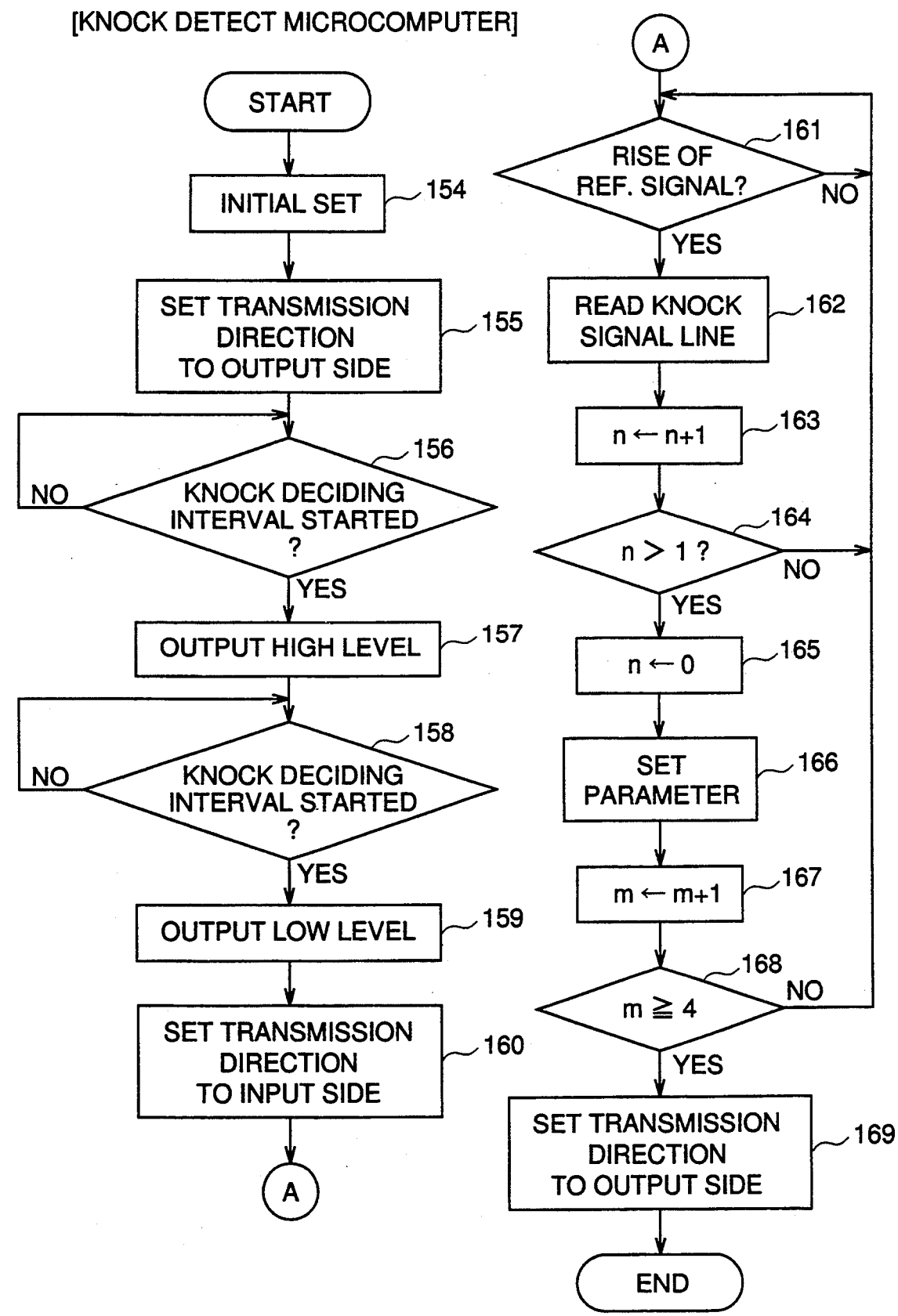
FIG. 23 is a flow chart showing a method of transmitting the knock deciding parameters in the knock detecting micom and corresponding to the timing chart of FIG. 19 in the aforementioned embodiment.

FIG. 23 is a flow chart showing the routine at the side of the knock detecting micom 6 of FIG. 19. This routine is initialized at Step 154, and the transmitting direction of the knock deciding signal line is set at Step 155 to the output side. Next, it is decided at Step 156 whether or not the knock deciding interval is started, and this start is awaited.

If it is decided that the knock deciding interval has been started, the high level is outputted at Step 157 to the knock deciding signal line so that the knock deciding parameter output allowing signal may be outputted to the engine controlling micom 7. It is decided at Step 158 whether or not the knock deciding interval of a subsequent ignition is started. If the answer is YES, the low level is outputted at Step 159 to the knock deciding signal line, and the transmitting direction of the knock deciding signal line is set at Step 160 to the input side so as to receive the knock deciding parameter data from the engine controlling micom 7.

It is then decided at Step 161 whether or not the reference signal falls. If the answer is NO, it is awaited that the fall is decided. If the fall is decided, 1 bit of the knock deciding parameter data is read at Step 162 from the knock deciding signal line. At Step 163, the bit counter n is incremented. It is decided at Step 164 whether or not the bit counter n exceeds 1, that is, whether one knock deciding parameter data has been read. If the answer is NO (n≦1), the routine is returned to Step 161. If the answer is YES, the bit counter n is reset at Step 165 to 0. At Step 166, the read knock deciding parameter is set.

Next, a knock deciding parameter No.m is incremented at Step 167. It is decided at Step 168 whether or not the parameter No.m exceeds 4, that is, whether or not the reading and setting of all the knock deciding parameters have been ended. If the answer is NO, the routine is returned to Step 161. If the answer is YES, on the other hand, the transmitting direction of the knock deciding signal line is set at Step 169 to the output side so as to output the normal decided knock result.

Here, the knock deciding parameter No.m and the bit counter n are set to 0 at the initializing time of Step 154.

Figure 24:
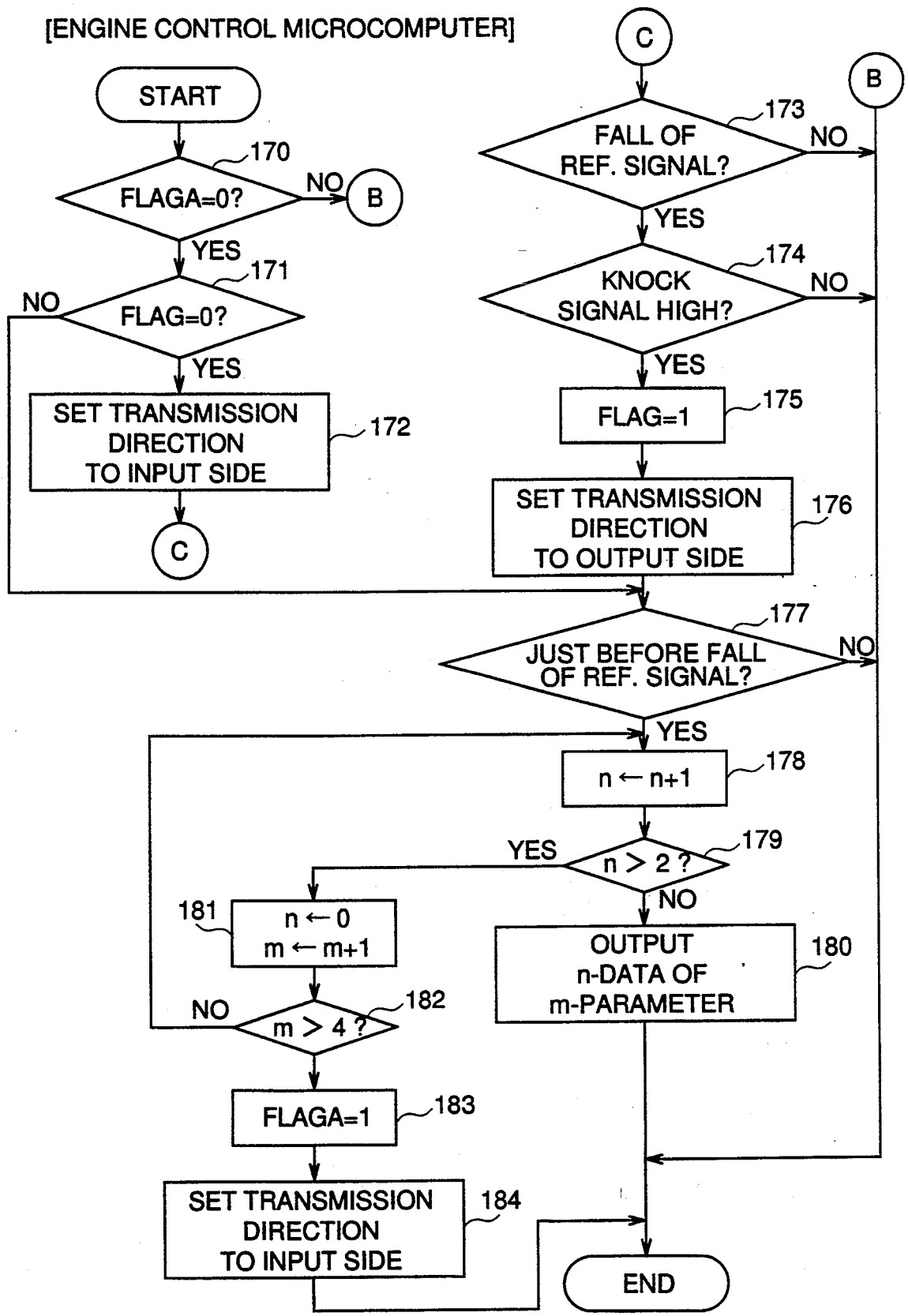
FIG. 24 is a flow chart showing a method of transmitting the knock deciding parameters in the engine controlling micom and corresponding to the timing chart of FIG. 19 in the aforementioned embodiment.

FIG. 24 is a flow chart showing the routine at the side of the engine controlling micom 7 of FIG. 19.

Steps 173 to 176 are included in a routine for allowing the output of the knock deciding parameter data and are executed at the falling timing of the reference signal. Steps 177 to 184 are included in a routine for outputting the knock deciding parameter data to the knock detecting micom 6 and are executed at the timing immediately before the fall of the reference signal.

At Step 170, it is decided whether or not a knock deciding parameter setting allowing flag FLAGA is 0. If the answer is YES, it is decided that the knock deciding parameter setting is allowed, and the routine is advanced to Step 171. If the flag FLAGA is 1, it is decided that the knock deciding parameters are not set, and this routine is skipped to execute another routine.

At Step 171, it is decided whether or not a knock deciding parameter data output allowing flag FLAG is 0. If this flag FLAG is 0, the transmitting direction of the knock deciding signal line is set at Step 172 to the input side so as to read the knock deciding parameter data output allowing signal from the knock detecting micom 6. At Step 173, it is decided whether or not the reference signal falls.

If the fall is decided at Step 173, the knock deciding signal line is read and is decided at Step 174 whether it is at the high or low level. If the knock deciding signal line is at the high level, the knock deciding parameter data output allowing flag FLAG is set at Step 175 to 1. At Step 176, the transmitting direction of the knock deciding signal line is set at Step 176 to the output side so as to output the knock deciding parameter data to the knock detecting micom 6.

If it is decided at Step 173 that the reference signal does not fall and if it is decided at Step 174 that the knock deciding signal line is at the low level, this routine is skipped to execute another routine. If it is decided at Step 171 that the knock deciding parameter data output allowing flag FLAG is 1, the routine advances to Step 177 because the output of the knock deciding parameter data is allowed.

At Step 177, it is decided whether or not the operation is immediately before the fall of the reference signal. If the answer is NO, this routine is skipped to execute to another routine. If immediately before the fall, the knock deciding parameter data bit counter n is incremented at Step 178. It is decided at Step 179 whether or not said bit counter n exceeds 2, that is, whether or not one knock deciding parameter data has been outputted. If the answer is NO (n≦2), the n-th bit output data of the knock deciding parameter No.m is outputted at Step 180 to the knock deciding signal line.

If it is decided at Step 179 that one knock deciding parameter data has been outputted (n>2), at Step 181, the bit counter n is reset to 0, and the knock deciding parameter No.m is incremented. It is decided at Step 182 whether or not the parameter No.m exceeds 4, that is, whether or not all the knock deciding parameter data have been outputted to the knock detecting micom 6.

If it is decided at Step 182 that all the knock deciding parameter data have been outputted (m>4), the knock deciding parameter setting allowing flag FLAGA is set at Step 183 to 1, and the transmitting direction of the knock deciding signal line is set at Step 184 to the input side so as to read the normal decided knock result.

If it is decided at Step 182 that all the knock deciding parameter data have not been outputted (n≦4), the routine is returned to Step 178. Now, the knock deciding parameter data bit counter n and the knock deciding parameter No.m are set to 0 at the initializing time of the engine controlling micom 7.

Figure 20:
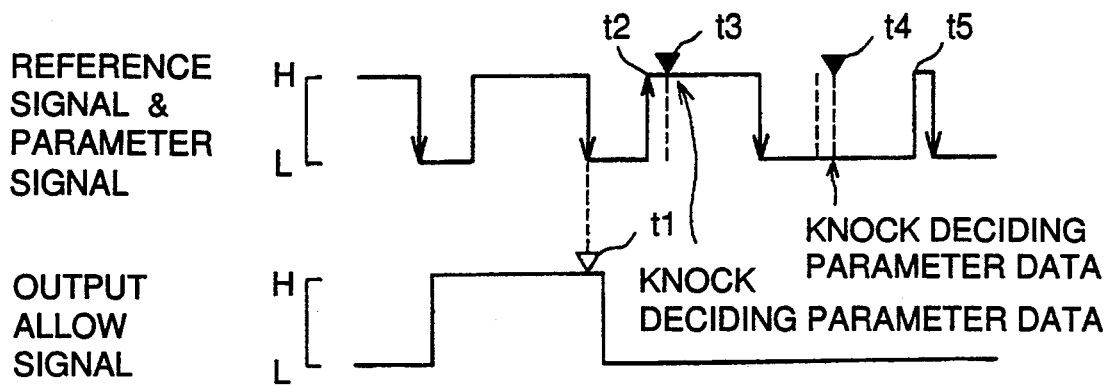
FIG. 20 is a timing chart showing another embodiment of the method of transmitting the knock deciding parameters in the aforementioned embodiment.
Figure 25:
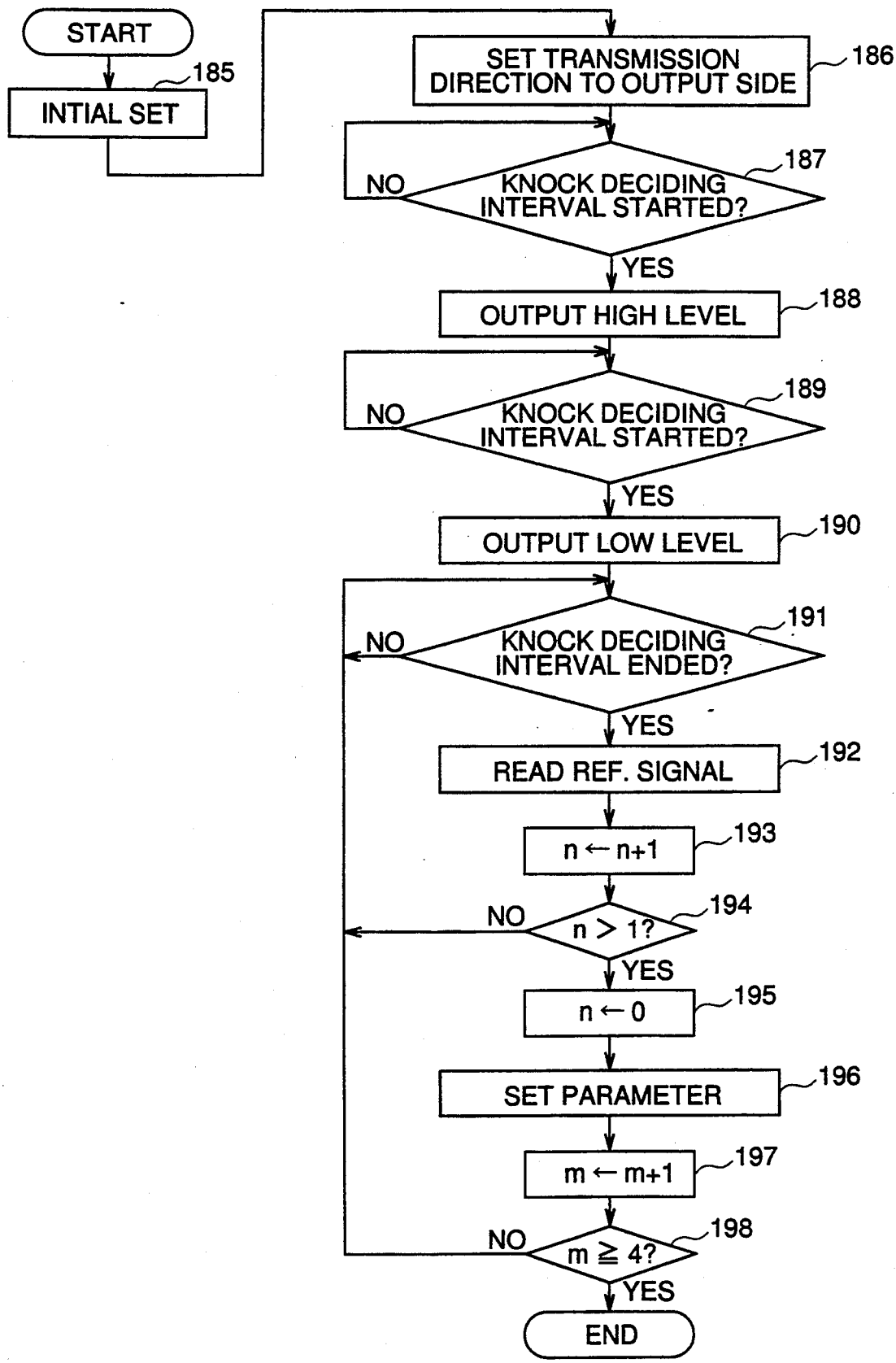
FIG. 25 is a flow chart showing a method of transmitting the knock deciding parameters in the knock detecting micom and corresponding to the timing chart of FIG. 20 in the aforementioned embodiment.

FIG. 25 is a flow chart showing the routine at the side of the knock detecting micom 6 of FIG. 20. Steps 185 to 190 are used for outputting the knock deciding parameter data output allowing signal to the engine controlling micom 7 and are identical to Steps 154 to 159 of FIG. 23.

At Step 191, it is decided whether or not the knock deciding interval is ended, and the decision of the end of the knock deciding interval is awaited. If this end is decided, 1 bit of the knock deciding parameter data is read at Step 192 from the reference signal line, and the routine advances to Step 193. Steps 193 to 198 are used for setting the knock deciding parameter data and are identical to Steps 163 to 168 of FIG. 24.

Figure 26:
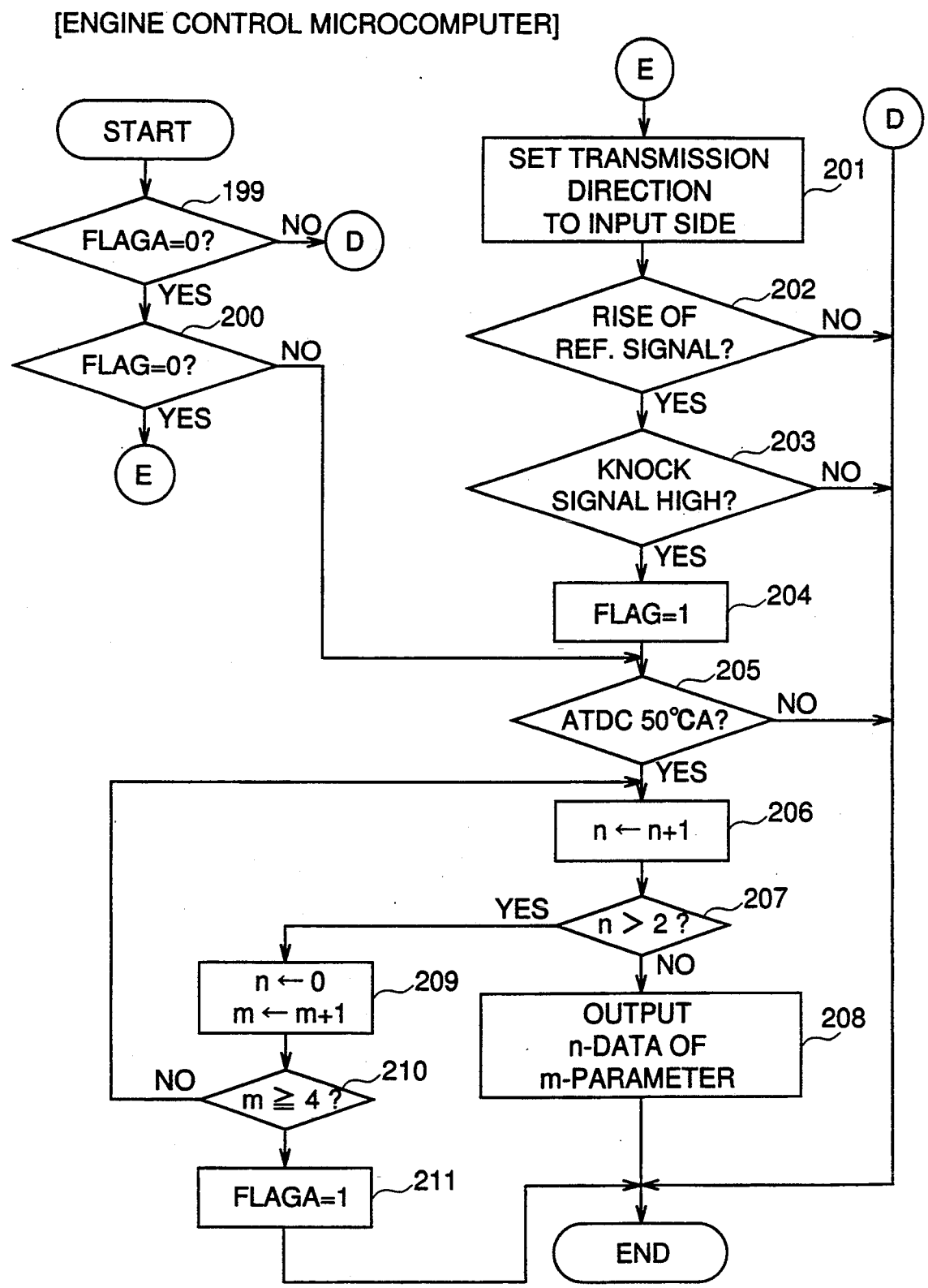
FIG. 26 is a flow chart showing a method of transmitting the knock deciding parameters in the engine controlling micom and corresponding to the timing chart of FIG. 20 in the aforementioned embodiment.

FIG. 26 is a flow chart showing the routine at the side of the engine controlling micom 7 of FIG. 20. Steps 199 to 204 are used for reading the knock deciding parameter data output allowing signal and are identical to Steps 170 to 175 of FIG. 24. At Step 205, it is decided whether or not the operation is after the top dead center (ATDC) 50° C. A. If the answer is NO, this routine is skipped to execute another routine. If the answer is YES, the routine advances to Step 206.

Steps 206 to 211 are used to output the knock deciding parameter data to the knock detecting micom 6 through the reference signal line and are identical to Steps 178 to 183 of FIG. 25. The knock deciding parameter data are outputted at Step 180 of FIG. 24 to the knock deciding signal line but at Step 208 of FIG. 26 to the reference signal line.

What is claimed is:

1. A knock control system for internal combustion engines comprising:
    knock vibration detecting means for detecting knocking vibration of an internal combustion engine;
    knock deciding means including an analog-digital converter and a microcomputer for digitally deciding occurrence of knock in response to output signals of said knock vibration detecting means;
    casing means mounted on said engine and encasing therein said knock vibration detecting means and said knock deciding means;
    electrical connection means for electrically connecting said knock vibration detecting means and said knock deciding means within said casing means; and
    connector means provided on said casing means for outputting therefrom knock information decided by said knock deciding means.

2. A knock control system according to claim 1 further comprising:
    knock control means provided outside of said casing means for controlling said engine in response to said knock information of said knock deciding means;
    signal line means for electrically connecting said knock deciding means and said knock control means through said connector means; and
    transmission means for transmitting through said signal line means said knock information and a failure information between said knock deciding means and said knock control means.

3. A knock control system according to claim 2, wherein said transmission means includes;
    means for transmitting said knock information and said failure information by a predetermined combination of a level change in a present signal relative to a previous signal transmitted through said transmission means.

4. A knock control system according to claim 2, wherein said knock deciding means includes;
    parameter selecting means for selecting, in response to a signal applied from said knock control means, a parameter for use in knock decision.

5. A knock control system according to claim 1, wherein said knock deciding means includes:
    resistance division means for producing a voltage by dividing resistances; and
    parameter selecting means for selecting a parameter of said knock deciding means in accordance with said voltage of said resistance division means.

6. A knock control system according to claim 1, wherein said knock deciding means includes;
    filter means connected between said knock vibration detecting means and said analog-digital converter for passing therethrough only output signal of said knock vibration detecting means in a predetermined frequency band specific to knock; and
    switching means for switching said predetermined frequency band from cylinder to cylinder of said engine.

7. A knock control system according to claim 1, wherein said knock deciding means includes:
    filter means connected between said knock vibration detecting means and said analog-digital converter for passing therethrough only output signal of said knock vibration detecting means in predetermined frequency band specific to knock; and
    switching means for switching said predetermined frequency band in accordance with revolution number of said engine.

8. A knock control system according to claim 2, wherein said microcomputer includes:
    intensity detecting means for detecting intensity of knock from output signal of said knock vibration detecting means; and
    intensity output means for outputting to said knock control means said detected intensity of knock by a combination of signal level changes relative to a signal level transmitted previously through said signal line means.

9. A knock control system according to claim 8, wherein said knock control means includes:
    memory means for memorizing signal level outputted from said intensity output means;
    intensity restoring means for restoring intensity of knock from a combination of level change in signals between a presently transmitted signal and a previous signal stored in said memory means;
    ignition control means for controlling an ignition timing of said engine in response to a restored result of said restoring means; and
    auxiliary control means for retarding the ignition timing by a predetermined angle when the combination of level change in the presently transmitted signal relative to said previous signal stored in said memory means is unchanged.

10. A knock control system for an internal combustion engine, comprising:

knock deciding means having integrally packaged therein a knocking vibration detecting unit for detecting a knocking vibration in an internal combustion engine, and a knock deciding unit for deciding a knock on the basis of an output signal of said knocking vibration detecting unit; and knock control means made separate from said knock deciding means and communicating through a signal line with said knock deciding means for controlling the internal combustion engine on the basis of the decided knock result of said knock deciding means, wherein said knock deciding unit includes:

intensity detecting means for detecting the intensity of the knocking from the output signal of said knocking vibration detecting unit; and knocking intensity outputting means for outputting the knocking intensity from said intensity detecting means to said knock control means in combination with the change of the level of said signal line to the previous signal line level, and wherein said knock control means includes:

knocking intensity reading means for reading the signal line level outputted from said outputting means;

memory means for storing the signal line level read by said reading means;

knocking intensity restoring means for restoring the knocking intensity in combination of the change in the signal line level just read, to the previous signal line level stored in said memory means;

control means for controlling an ignition timing in accordance with the restored result; and auxiliary control means for controlling the ignition timing to a predetermined retard angle in case of a combination in which said read signal line level is unchanged from said previous signal line level.

11. A knock control system for an internal combustion engine, according to claim 10, wherein the combination of the change of said signal line level to said previous signal line level occurs twice for one ignition.

12. A knock control system for an internal combustion engine, as set forth in claim 10, wherein said knock control means further includes:

second auxiliary control means for controlling the ignition timing to a predetermined retard angle by deciding that said knock deciding means is troubled, if it continues for a predetermined period that the knock is high, as a result of said knocking intensity restoring means.

13. A knock control system for an internal combustion engine, comprising:

knock deciding means having integrally packaged therein a knocking vibration detecting unit for detecting a knocking vibration to be established in an internal combustion engine, and a knock deciding unit for deciding a knock on the basis of an output signal of said knocking vibration detecting unit; and knock control means made separate from said knock deciding means and communicating through a signal line with said knock deciding means for controlling the internal combustion engine on the basis of the decided knock result of said knock deciding means, wherein said knock deciding means includes:

A/D conversion means for converting an analog output into a digital output;

selection means for outputting a plurality of input signals selectively to said A/D conversion means;

a set of series resistors connected on one side with a power supply and on the other with the ground and further connected at a plurality of portions thereof with the input of said selection means;

parameter setting means for setting a parameter relating to a knock decision in accordance with the digital value which is read by said A/D conversion means through said selection means from one of voltage values different depending upon the positions of connection with said set of series resistors;

intensity detecting means for detecting the intensity of the knock from the output signal of said knocking vibration detecting unit; and knocking intensity outputting means for outputting the knocking intensity from said intensity detecting means to said knock control means, and wherein said knock control means includes:

knocking intensity reading means for reading the knocking intensity outputted from said knocking intensity outputting means; and control means for controlling an ignition timing in accordance with the read result.

14. A knock control system for an internal combustion engine, comprising:

knock deciding means having integrally packaged therein a knocking vibration detecting unit for detecting a knocking vibration in an internal combustion engine, and a knock deciding unit for deciding a knock on the basis of an output signal of said knocking vibration detecting unit; and knock control means made separate from said knock deciding means and communicating through a signal line with said knock deciding means for controlling the internal combustion engine on the basis of the decided knock result of said knock deciding means, wherein said knock deciding means includes:

A/D conversion means for converting an analog output into a digital output;

selection means for outputting a plurality of input signals selectively to said A/D conversion means;

a set of individually series-connected resistors connected on one side with a power supply and on the other with the ground and further connected at the individual voltage-divided points thereof with the input of said selection means;

parameter setting means for setting a parameter relating to a knock decision in accordance with the digital value which is read by said A/D conversion means through said selection means from one of voltage values different depending upon the resistances of said set of series resistors;

intensity detecting means for detecting the intensity of the knock from the output signal of said knocking vibration detecting unit; and knocking intensity outputting means for outputting the knocking intensity from said intensity detecting means to said knock control means, and wherein said knock control means includes:

knocking intensity reading means for reading the knocking intensity outputted from said knocking intensity outputting means; and control means for controlling an ignition timing in accordance with the read result.

15. A knock control system for an internal combustion engine, according to claim 14,
wherein said knock control means further includes:
parameter data outputting means for outputting the data of the parameters relating to the knock decision to said knock deciding unit in accordance with said signal line level, and
wherein said knock deciding unit includes:
parameter data reading means for reading the signal line level outputted from said parameter data outputting means; parameter data restoring means for restoring the data of the parameters relating to the knock decision from the read signal line level; and parameter setting means for setting the parameters relating to the knock decision in accordance with the restored result.

16. A knock control system for an internal combustion engine, according to claim 15, wherein said knock deciding unit further includes:
allowance signal outputting means for outputting a signal for allowing the parameter data relating to the knock decision to be outputted from said knock control means, to said knock control means in accordance with said signal line level; and
first output direction switching means for switching the output direction of the signal line to the reading side, after said signal has been outputted by said knocking intensity outputting means, and for switching the output direction of the signal line back to the outputting side after all the parameter data relating to the knock decision outputted from said knock control means have been read to end the setting of the parameters, and
wherein said knock control means further includes:
allowance signal reading means for reading said allowance signal outputted from said allowance signal outputting means; and
second output direction switching means for switching the output direction of said signal line to the outputting side, after said allowance signal has been read, and the same back to the reading side after all the parameter data relating to the knock decision have been outputted to said knock deciding unit.

17. A knock control system for an internal combustion engine, according to claim 15,
wherein the output of the signal from said knock deciding unit for allowing the output of the parameter data relating to said knock decision is carried out through the signal line for outputting the knocking intensity from said intensity detecting means, and
wherein the output of the parameter data relating to said knock decision after the output allowing signal of said parameter data has been read is carried out through the signal line of a reference angular signal which is outputted from said knock control means to said knock deciding unit so as to time said knock deciding unit.

18. A knock control system for an internal combustion engine, according to claim 15, wherein the setting of the parameters relating to said knock decision is executed at an initial stage of operation of said knock deciding unit.

19. A knock control system for an internal combustion engine, according to claim 10,
wherein said knock deciding unit includes:
a switched capacitor filter for receiving the output signal of said knocking vibration detecting unit to allow a signal having a predetermined frequency band intrinsic to a knock to pass therethrough;
running status detecting means for detecting the running status of the internal combustion engine; and
a filter control circuit for changing the signal passing frequency band of said switched capacitor filter by adjusting a switching drive frequency to said switched capacitor filter in accordance with the running status of the internal combustion engine detected by said running status detecting means.

20. A knock control system for an internal combustion engine, according to claim 13,
wherein said knock deciding unit includes:
a switched capacitor filter for receiving the output signal of said knocking vibration detecting unit to allow a signal having a predetermined frequency band intrinsic to a knock to pass therethrough;
running status detecting means for detecting the running status of the internal combustion engine; and
a filter control circuit for changing the signal passing frequency band of said switched capacitor filter by adjusting a switching drive frequency to said switched capacitor filter in accordance with the running status of the internal combustion engine detected by said running status detecting means, and
wherein the parameters relating to said knock decision are those which relate to at least one of a knocking deciding level, the period for deciding the knock, a failure deciding level, and the signal passing frequency band of said switched capacitor filter.

* * * * *